(12) United States Patent
Augustine

(10) Patent No.: US 12,477,187 B2
(45) Date of Patent: Nov. 18, 2025

(54) SYSTEMS AND METHODS FOR MEDIA-LINKED TRANSACTIONS CONCURRENT WITH MEDIA PLAYBACK

(71) Applicant: Streampipe Corporation, Wilmington, DE (US)

(72) Inventor: Daniel Christopher Augustine, Savannah, GA (US)

(73) Assignee: Streampipe Corporation, Menlo Park, CA (US)

( * ) Notice: Subject to any disclaimer, the term of this patent is extended or adjusted under 35 U.S.C. 154(b) by 0 days.

(21) Appl. No.: 18/439,603

(22) Filed: Feb. 12, 2024

(65) Prior Publication Data

US 2025/0260874 A1    Aug. 14, 2025

(51) Int. Cl.
*H04N 21/478* (2011.01)
*H04N 21/8547* (2011.01)

(52) U.S. Cl.
CPC ... *H04N 21/47815* (2013.01); *H04N 21/8547* (2013.01)

(58) Field of Classification Search
None
See application file for complete search history.

(56) References Cited

U.S. PATENT DOCUMENTS

| | | | | |
|---|---|---|---|---|
| 8,175,921 | B1 * | 5/2012 | Kopra | H04N 7/16 705/14.57 |
| 9,641,870 | B1 * | 5/2017 | Cormie | H04N 21/44222 |
| 2004/0233233 | A1 * | 11/2004 | Salkind | H04N 21/4725 348/E7.071 |
| 2013/0031582 | A1 * | 1/2013 | Tinsman | H04N 21/4316 725/36 |
| 2014/0282638 | A1 * | 9/2014 | Pequignot | H04N 21/47815 725/5 |
| 2015/0373385 | A1 * | 12/2015 | Straub | H04N 21/2668 725/34 |
| 2019/0043106 | A1 * | 2/2019 | Talmor | G06N 20/00 |
| 2020/0045363 | A1 * | 2/2020 | Nellore | H04N 21/812 |
| 2021/0042784 | A1 * | 2/2021 | Doumar | G06Q 30/0244 |
| 2021/0321170 | A1 * | 10/2021 | MacDougall | H04N 21/44222 |
| 2022/0248109 | A1 * | 8/2022 | Chandra | G06Q 30/0241 |
| 2023/0017614 | A1 * | 1/2023 | Srinivasa | G06V 20/42 |
| 2023/0044482 | A1 * | 2/2023 | Hallivis | G06Q 10/02 |

(Continued)

*Primary Examiner* — Ricky Chin
(74) *Attorney, Agent, or Firm* — Carr & Ferrell LLP

(57) ABSTRACT

Embodiments of the present disclosure include systems and methods for enabling a media-linked transaction concurrently with playback of media, an exemplary method comprising: connecting a media platform to a multi-layered model comprising a transaction layer, video layer, and device layer running in parallel on separate processor platforms; platforming the media, including preparing the media platform for upload, conversion, storage, and playing; receiving a viewer request to play a media file; initiating playback; displaying a transaction invite during the playback, the invite comprising: a visual element embedded within the playback and an active link associated with a transaction object, enabling the user to initiate the transaction within the visual element concurrently with and without interrupting the playback. User data in conjunction with video data is analyzed to determine the significance of video attributes.

20 Claims, 30 Drawing Sheets

(56) References Cited

U.S. PATENT DOCUMENTS

| | | | |
|---|---|---|---|
| 2023/0092530 A1* | 3/2023 | McRae | G06T 5/90 |
| | | | 348/143 |
| 2024/0256345 A1* | 8/2024 | Talavera | G06F 9/5027 |
| 2024/0281474 A1* | 8/2024 | Craft | G06Q 30/0255 |

* cited by examiner

FIG. 11

Streampipe

- Ad Offers
- Approved Ads
- Ads Awaiting Approv...
- Subscribers
- Pipes (Youtube, Faceboo...
- Products & Partnerships
- Messages
- Products
  - Overview
  - My Product Catalog
  - Search for Products
- Brand Partners
  - Overview
  - Your Brand Partners
  - Your Profile for Brands
  - Brands Directory
- Analytics
- Viewership
- eCommerce
- Subscriptions
- Donations/Tips
- Configuration
  - Users
    - Overview
    - My Team
    - Agency Access Agency Access
Users / Agency Access — 1410 e.g. filter for id, email, name, etc

| ID | EMAIL | NAME | ROLE | CREATED | LAST SIGNIN | DISABLED |
|---|---|---|---|---|---|---|
| #1 | bfitvhew0@ezinearticles.com | Bartel Fitchew | ADMIN | Aug 6, 2019 | Aug 14, 2019 4:00 PM | True |
| #2 | tscherme1@delicious.com | Tymon Scherme | ADMIN | Nov 7, 2019 | Sep 19, 2019 9:11 PM | True |
| #3 | dgowan2@histats.com | Danette Gowan | SUPERADMIN | May 23, 2020 | Jun 5, 6:03 AM | True |
| #4 | bbroomfield3@nbcnews.com | Bing Broomfield | ADMIN | Mar 13, 2020 | Sep 21, 2019 12:56 AM | True |
| #5 | rpitman4@cisco.com | Roy Pitman | ADMIN | Nov 24, 2019 | May 19, 2020 4:12 PM | False |
| #6 | ldeon5@topsy.com | Lucilia Dedon | ADMIN | Mar 21, 2020 | Jul 5, 2019 7:55 PM | True |
| #7 | grusted6@github.io | Gerti Rusted | ADMIN | Jul 4, 2019 | Jul 3, 2019 3:40 | True |
| #8 | imeconi7@etsy.com | Imelda Meconi | SUPERADMIN | Aug 19, 2019 | Feb 17, 2020 3:31 AM | False |
| #9 | bberthon8@archive.org | Bencite Berthon | ADMIN | May 31, 2019 | Apr 8, 2020 6:57 AM | False |
| #10 | srustan9@msn.com | See Rustan | | Jan 29, 2020 | 10 ▼ 1-10 of 100 | |

Row per page:

Save to this PC

SYSTEMS AND METHODS FOR MEDIA-LINKED TRANSACTIONS CONCURRENT WITH MEDIA PLAYBACK

FIELD OF INVENTION

The present technology pertains to systems and methods for allowing transactions to occur simultaneously with, on, or alongside a linked video and other multimedia. In particular, but not by way of limitation, the present technology provides a real-time multimedia transaction platform.

SUMMARY

In some embodiments the present technology is directed to systems and methods for conducting a video-linked transaction concurrently with video playback, an exemplary method comprising: a multi-layered model comprising a transaction layer, a video layer, and a device layer each running in parallel on separate processor platforms; a transaction platform supported on the transaction layer, the transaction platform communicatively coupled with a media platform over a network connection, the media platform supported by the video layer and configured for upload, conversion, storage, and playing of media content over the network connection, the transaction platform further coupled with at least one user device over the network connection; the transaction platform further comprising at least one computing device having a memory and a processor, the memory storing instructions which, when executed by the processor, perform the steps of a method comprising: receiving an indication that the media platform has initiated the playback of a particular media file in response to a user request; displaying one or more transaction invites to the viewer during the playback, the one or more transaction invites comprising: a visual element embedded within the playback; at least one active link associated with a transaction object supported by a transaction platform, the at least one active link enabling the user to initiate the media-linked transaction within the visual element concurrently with and without interrupting the playback; and receiving user data from the one or more transaction invites by the transaction layer and video data from the video layer, the user data being used in conjunction with the video data to determine significance of a video attribute.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
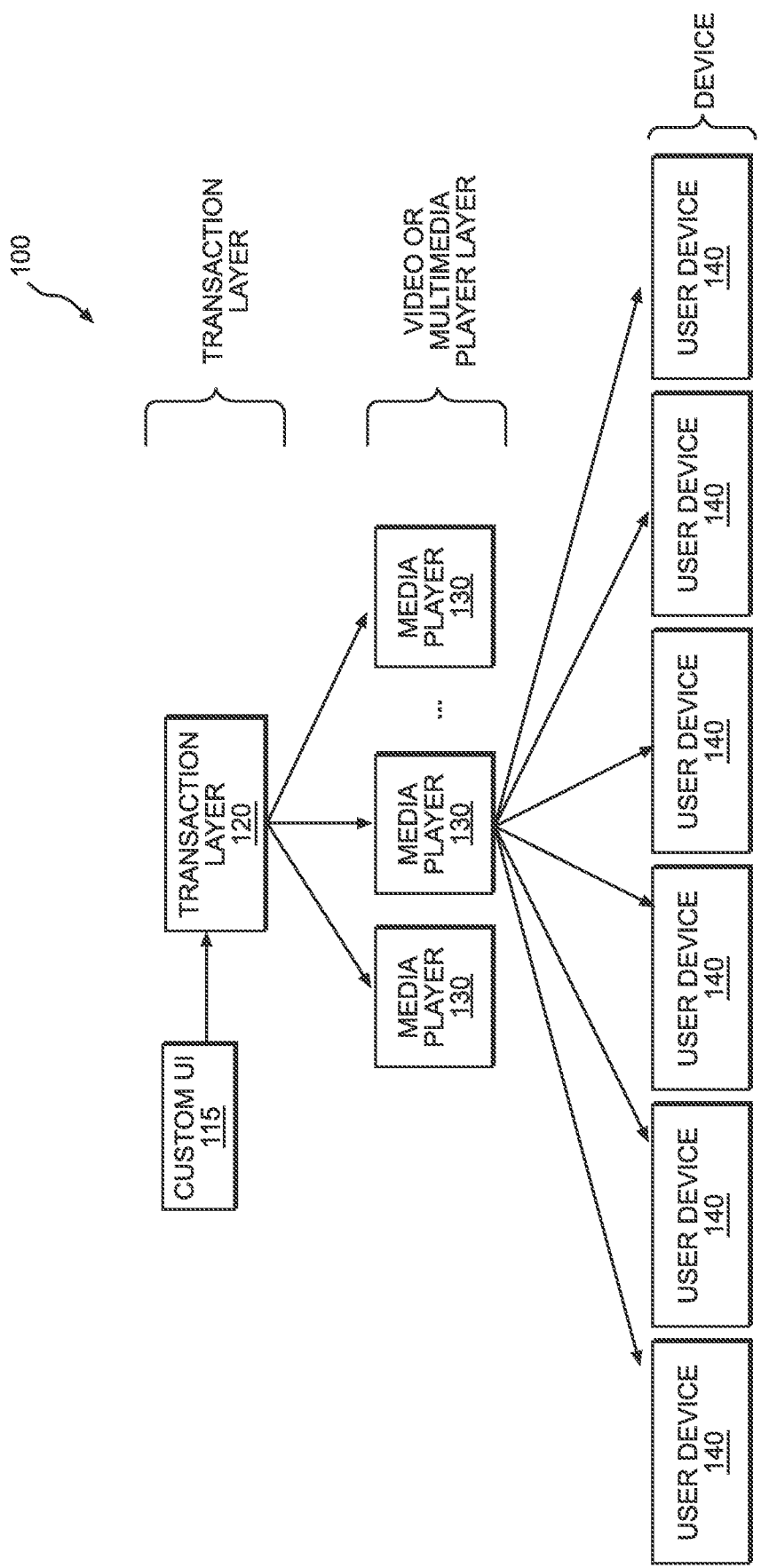

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 presents a diagrammatical representation of one embodiment of the relationship between the different components of the systems described herein.

Figure 2:
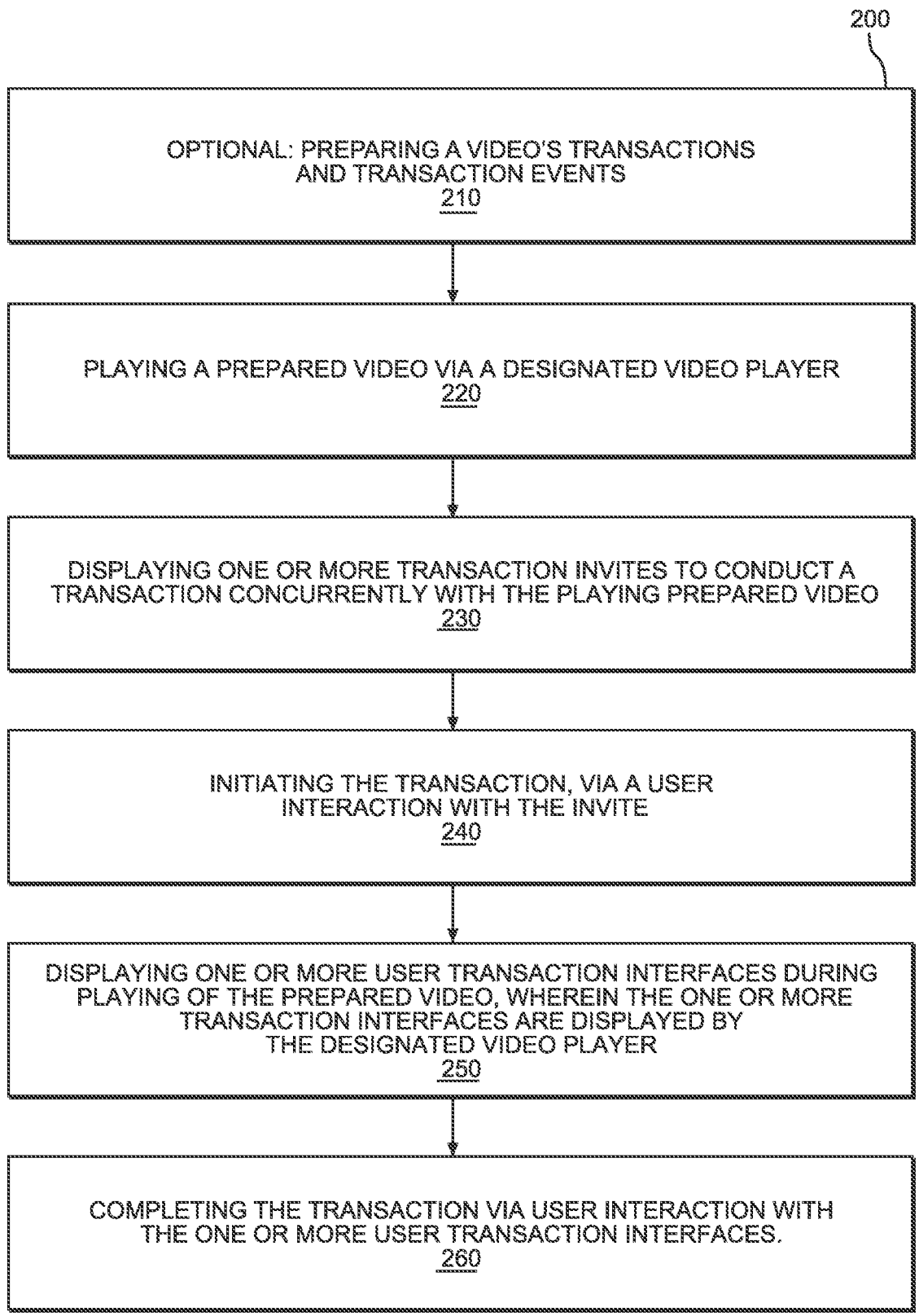

FIG. 2 presents a flow diagram of one embodiment to conduct a video-linked transaction concurrently with video playback.

Figure 3:
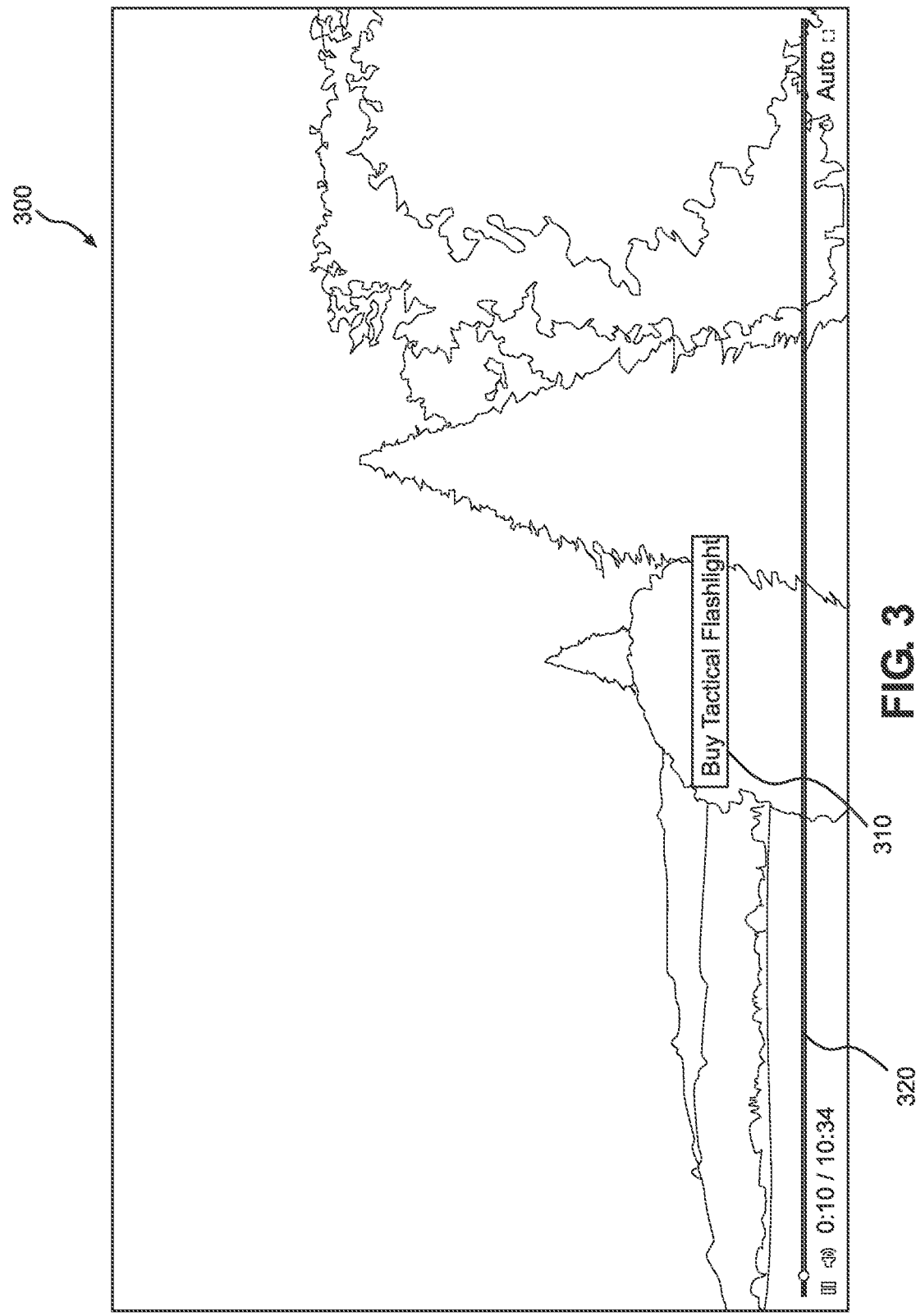

FIG. 3 presents one embodiment of a video player with an initial transaction step.

Figure 4:
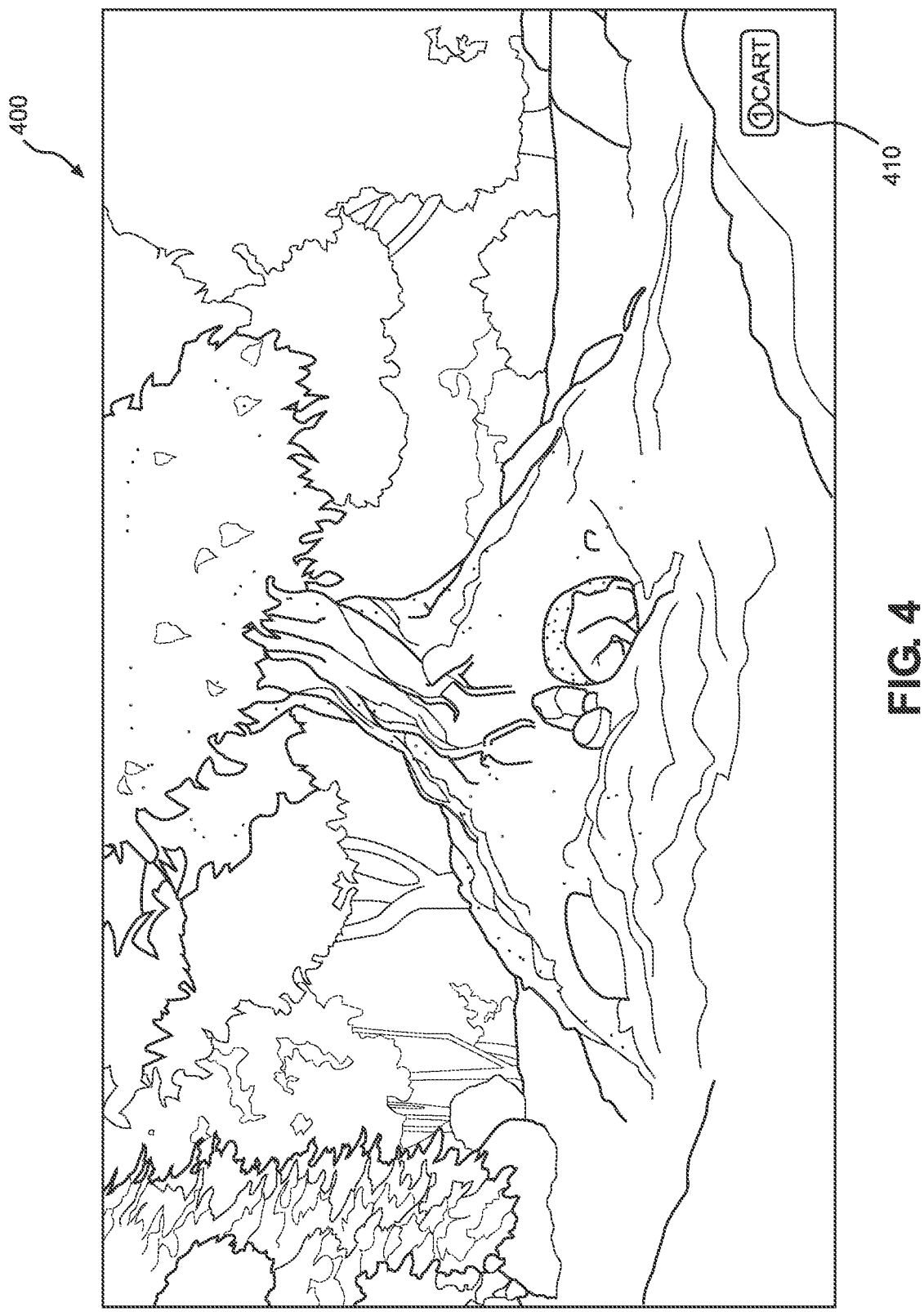

FIG. 4 presents one embodiment of a video player with a second transaction step.

Figure 5:
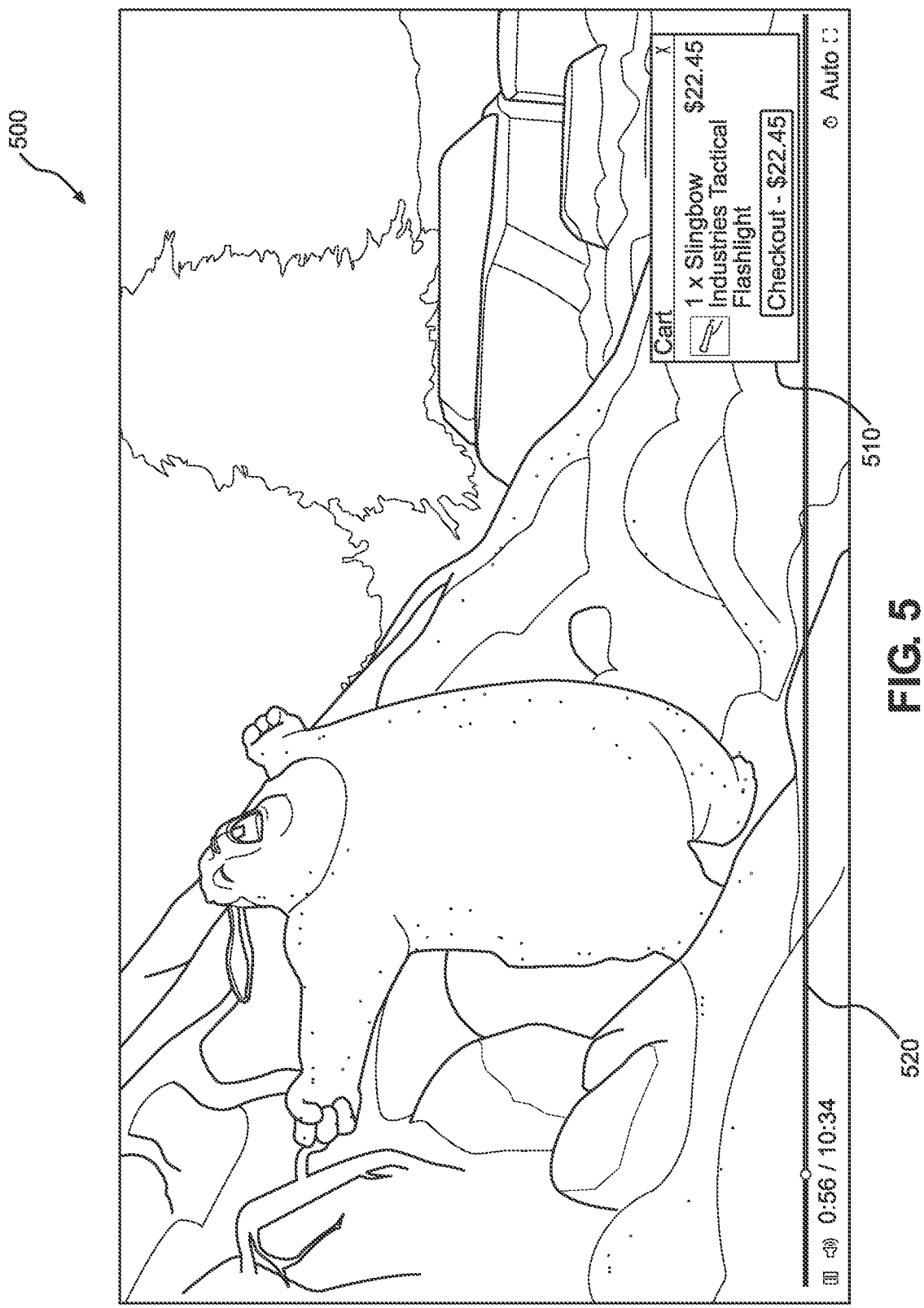

FIG. 5 presents one embodiment of a video player with a checkout transaction step.

Figure 6:
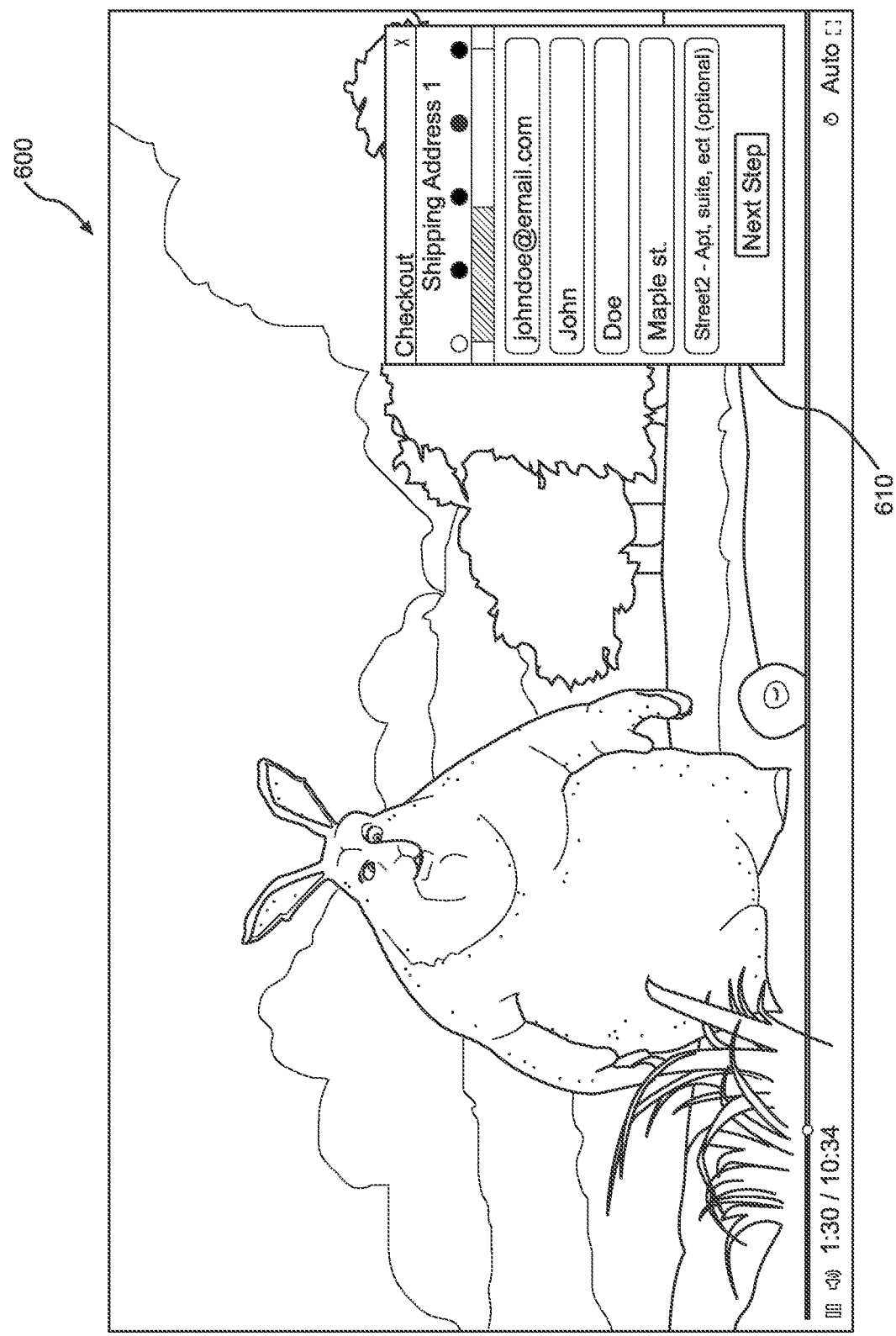

FIG. 6 presents one embodiment of a video player with a user input transaction step.

Figure 7:
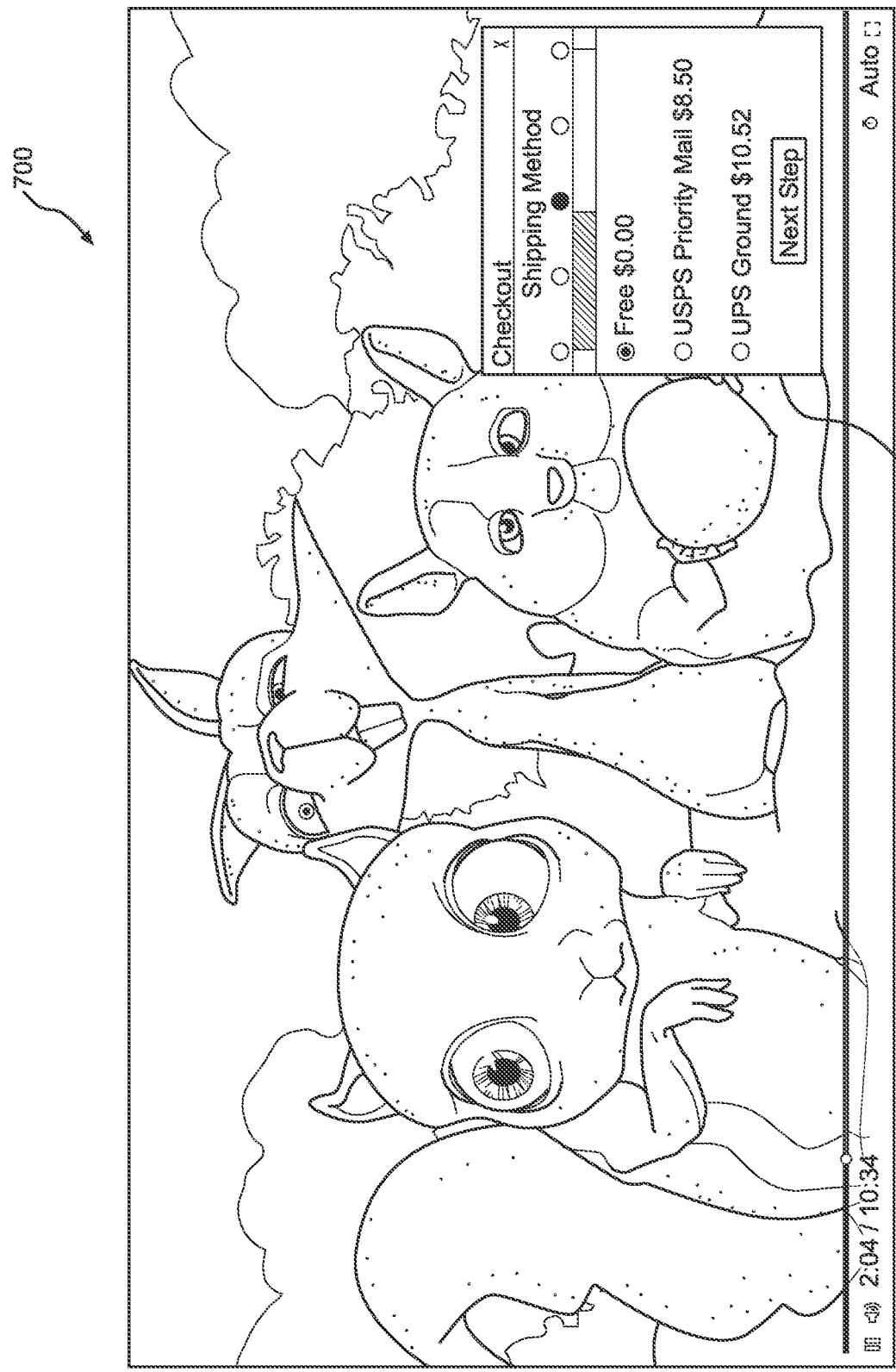

FIG. 7 presents one embodiment of a video player with a delivery method transaction step.

Figure 8:
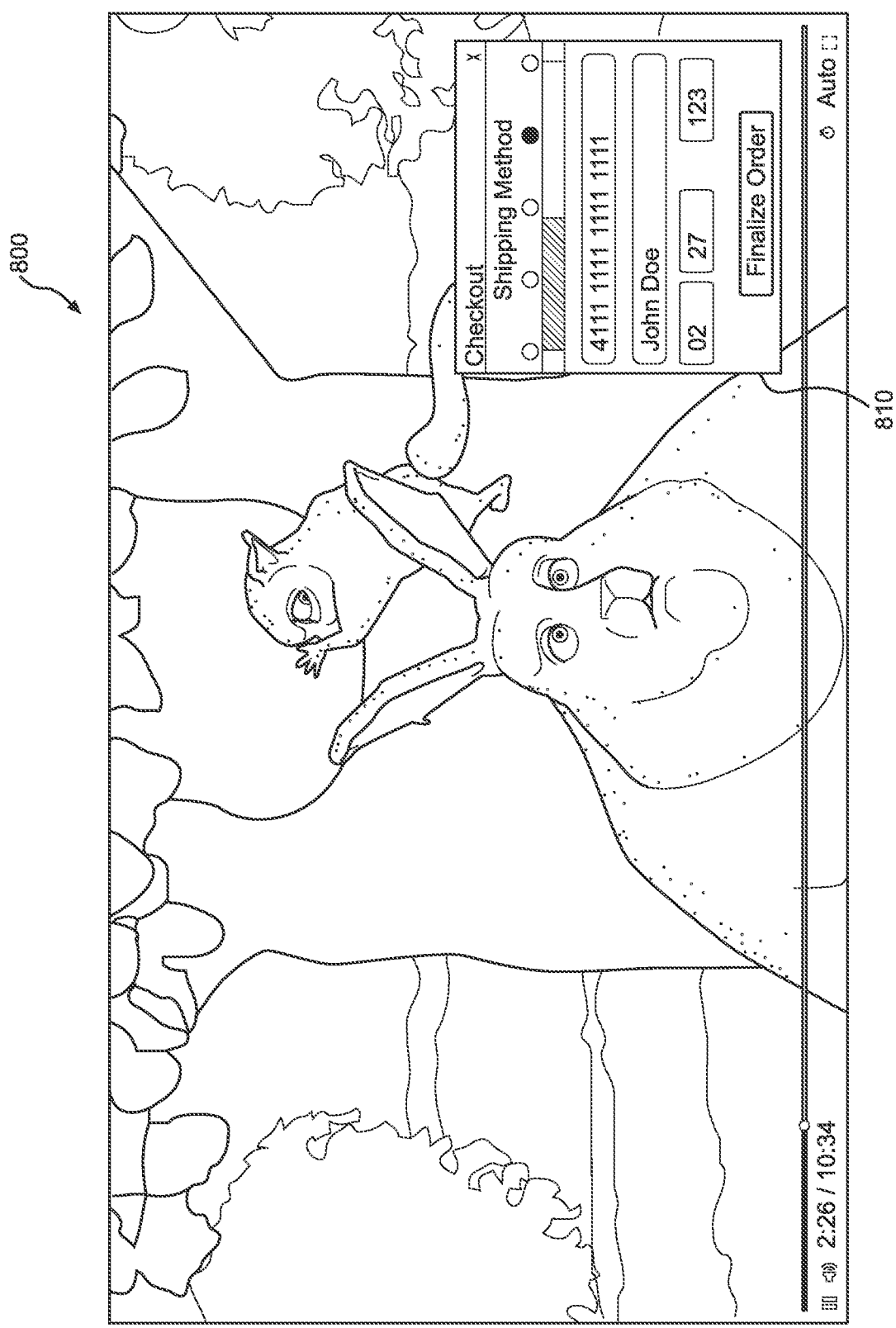

FIG. 8 presents one embodiment of a video player with a payment transaction step.

Figure 9:
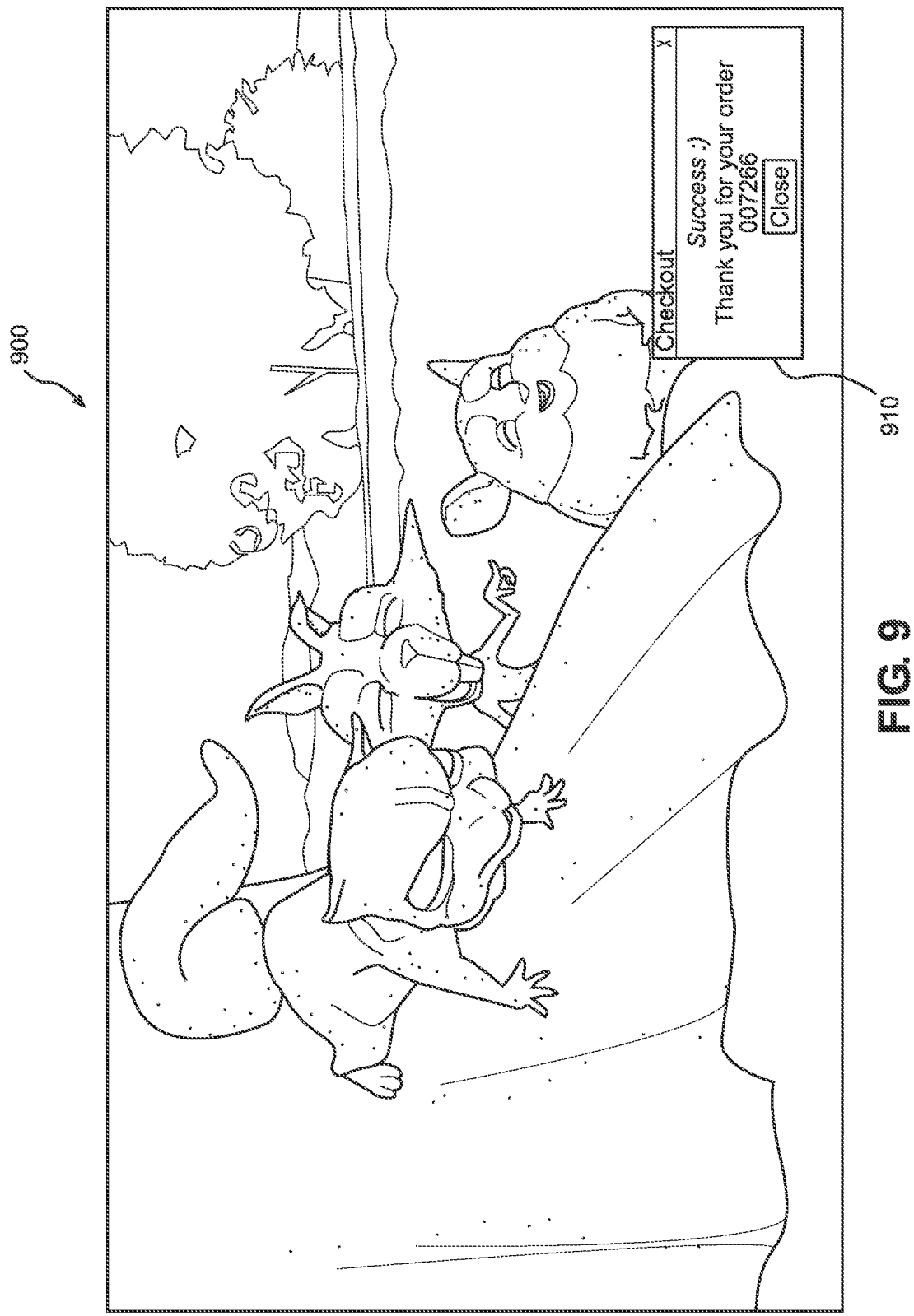

FIG. 9 presents one embodiment of a video player with a completed transaction.

Figure 10:
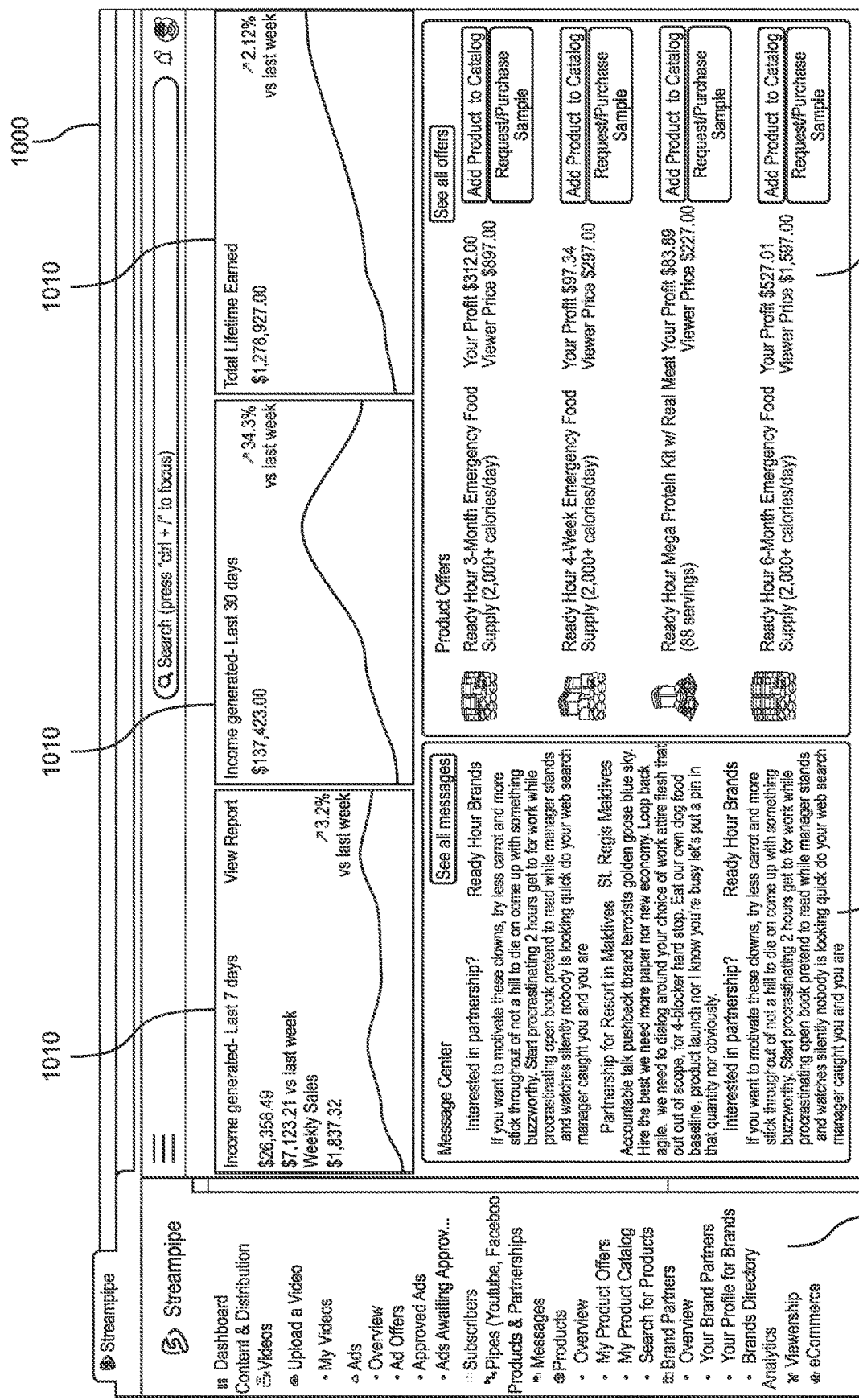

FIG. 10 presents one embodiment of the transaction platform user interface for a main dashboard.

Figure 11:
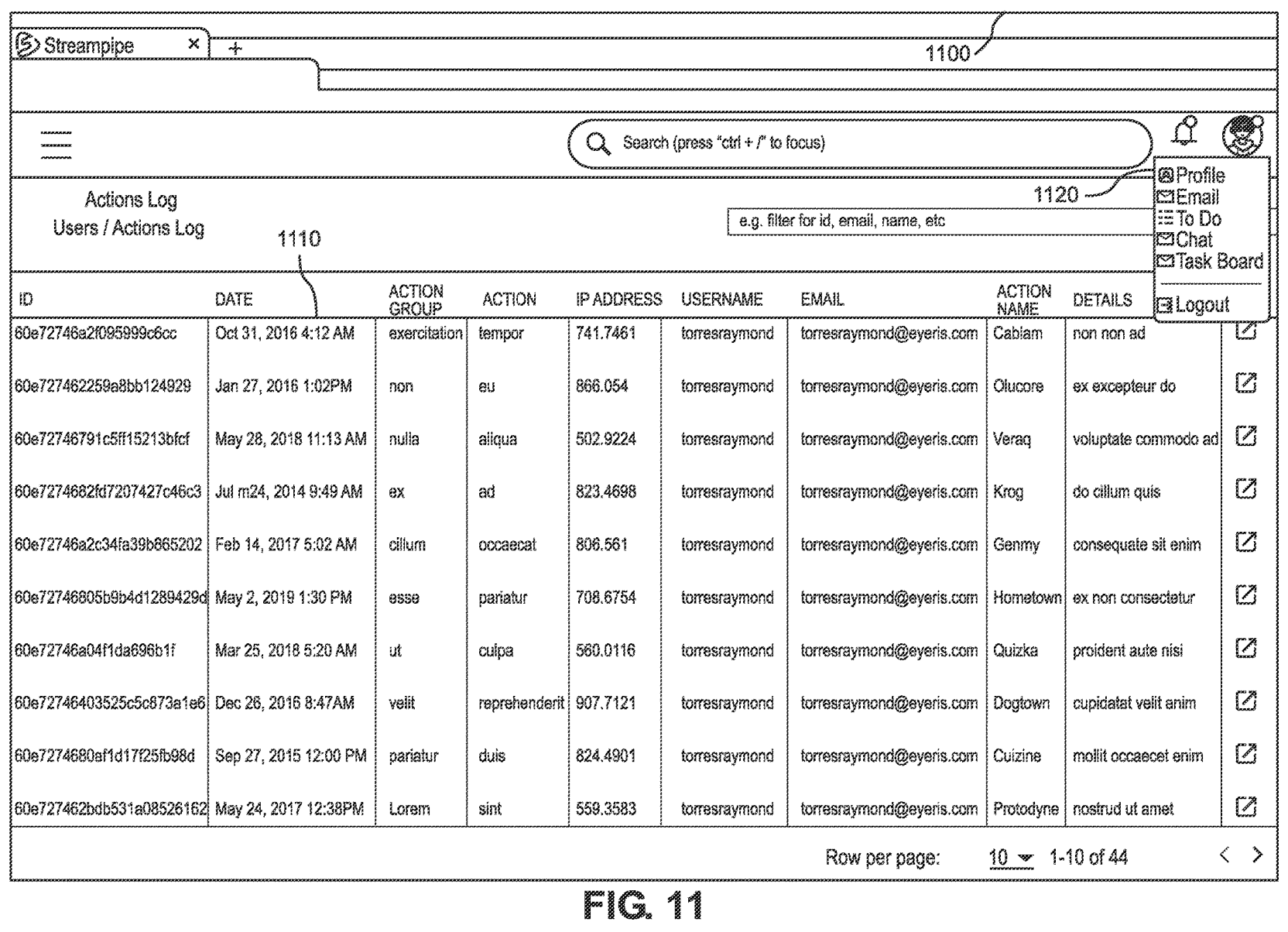

FIG. 11 presents one embodiment of the transaction platform user interface displaying the actions log without a sidebar.

Figure 12:
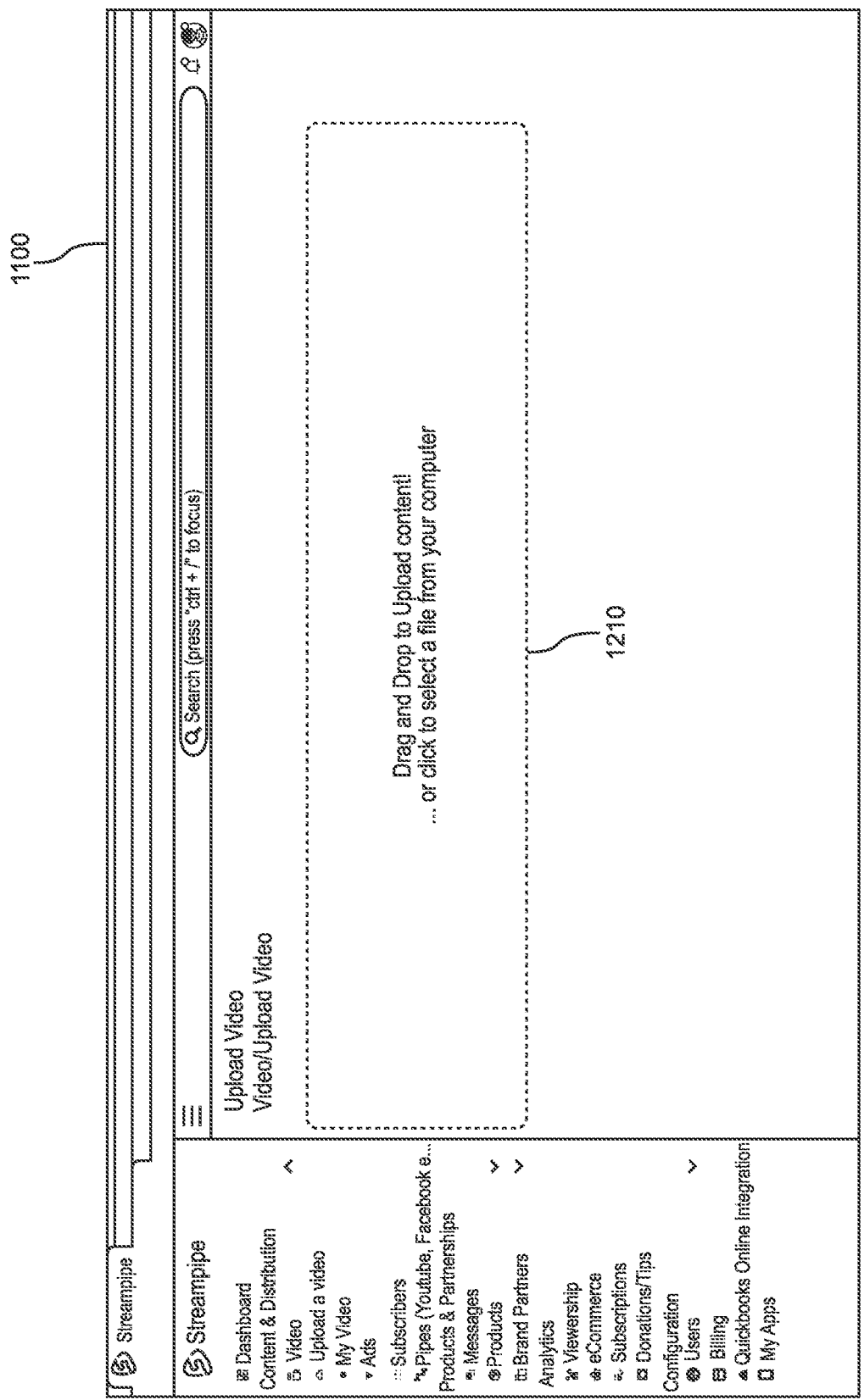

FIG. 12 presents one embodiment of the transaction platform user interface to upload a video.

Figure 13:
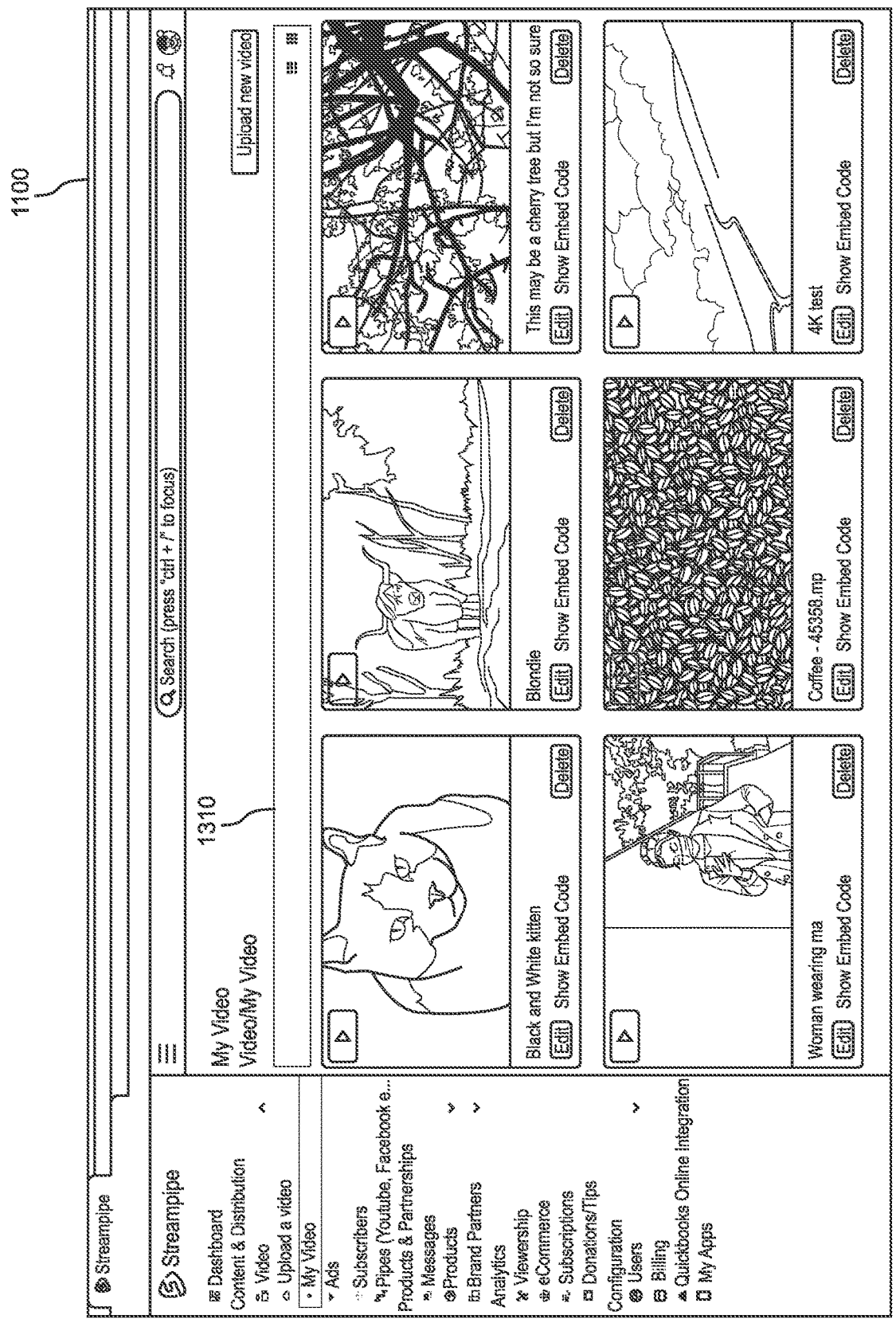

FIG. 13 presents one embodiment of the transaction platform user interface to display uploaded videos.

FIG. 14 presents one embodiment of the transaction platform user interface displaying access settings.

Figure 15:
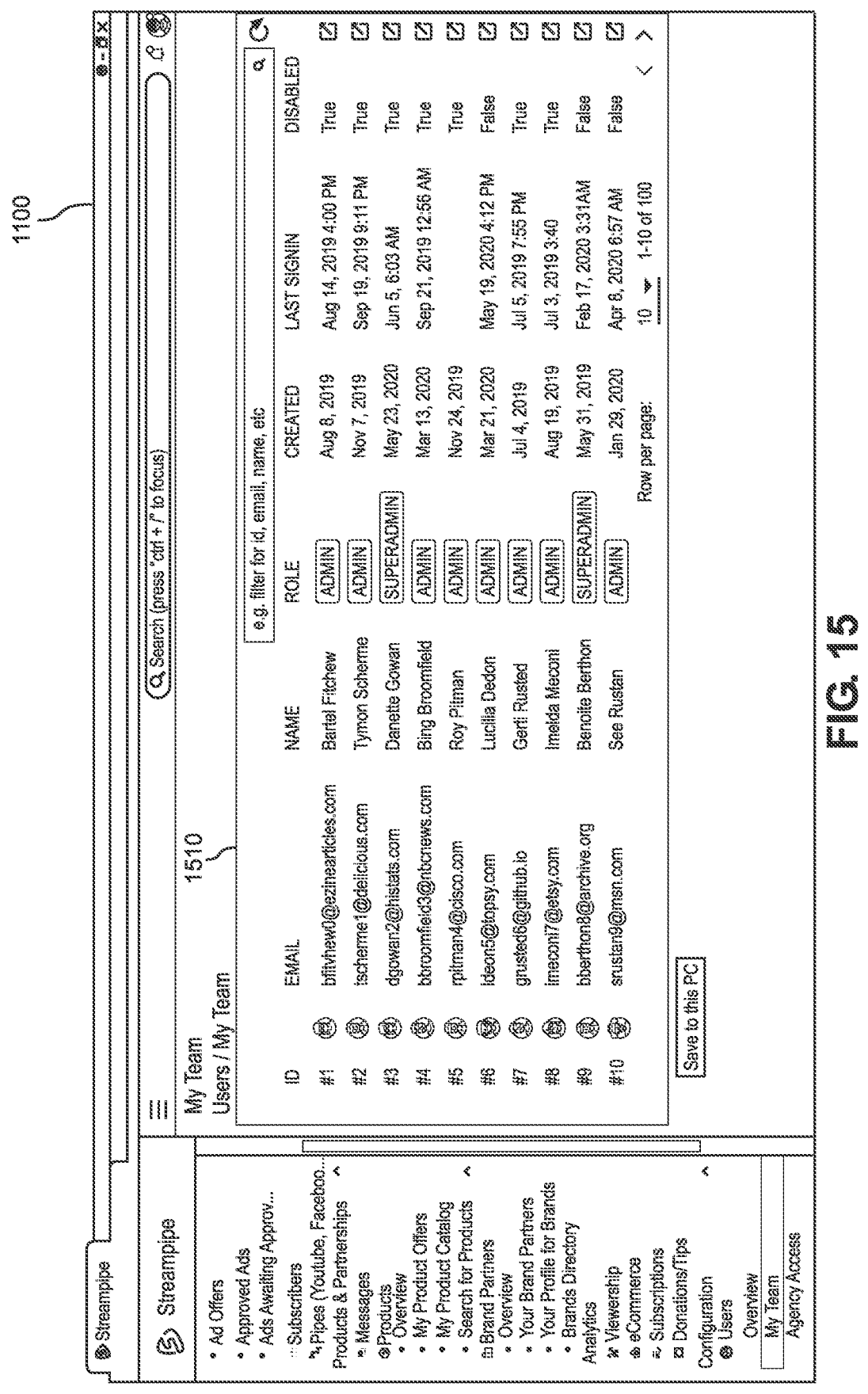

FIG. 15 presents one embodiment of the transaction platform user interface displaying team members.

Figure 16:
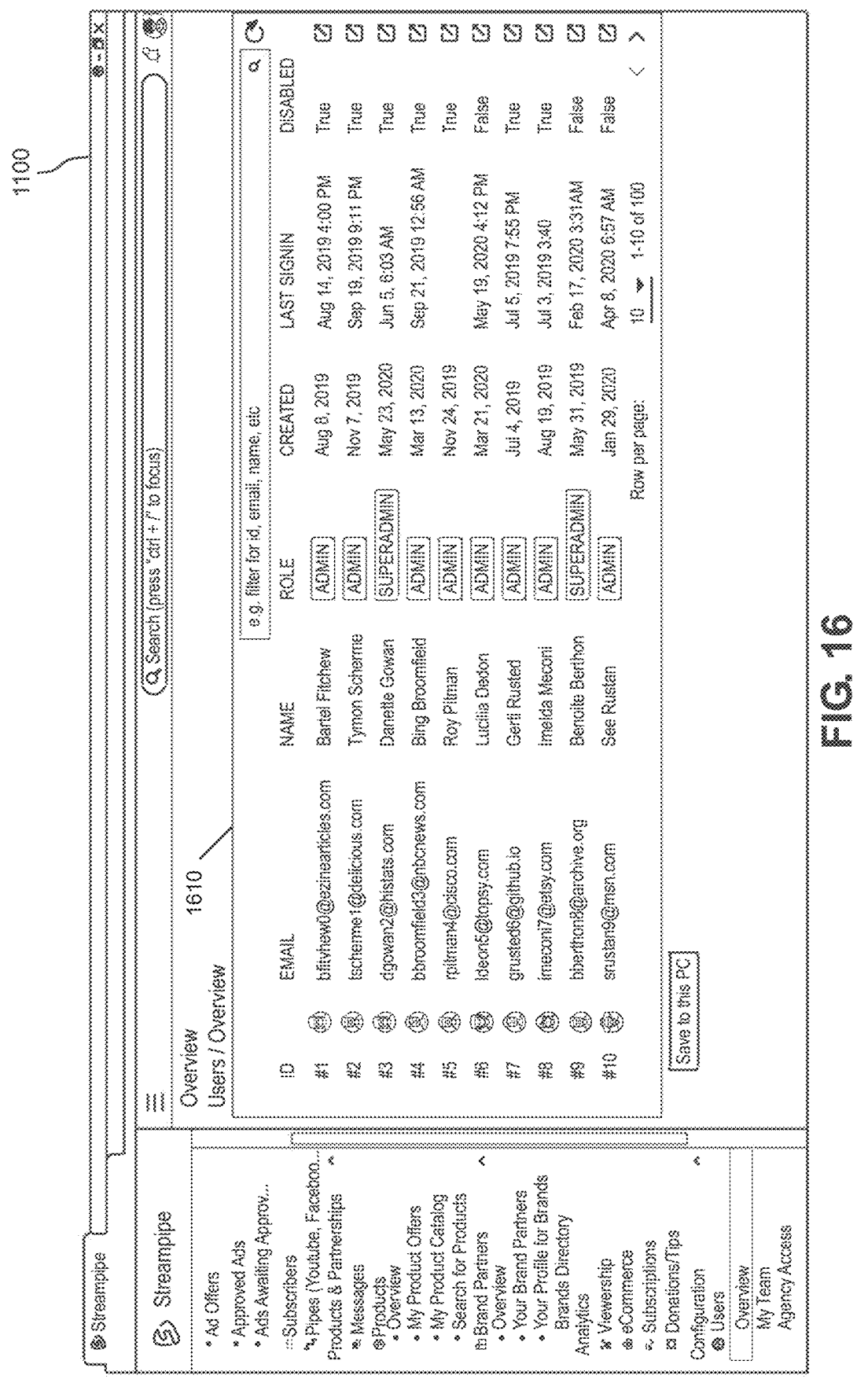

FIG. 16 presents one embodiment of the transaction platform user interface displaying a user overview page.

Figure 17:
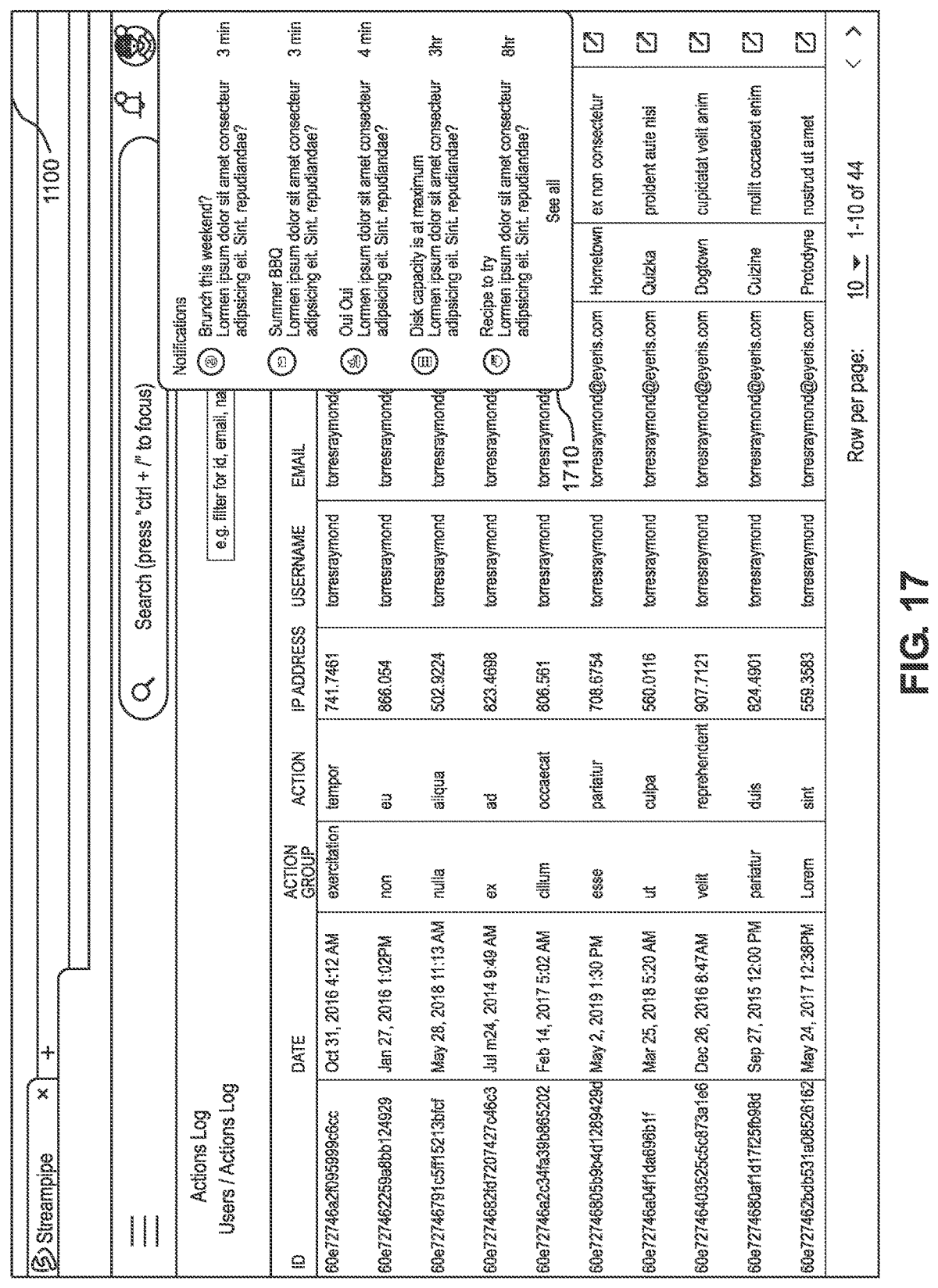

FIG. 17 presents one embodiment of the transaction platform user interface displaying a messaging notification bar.

Figure 18:
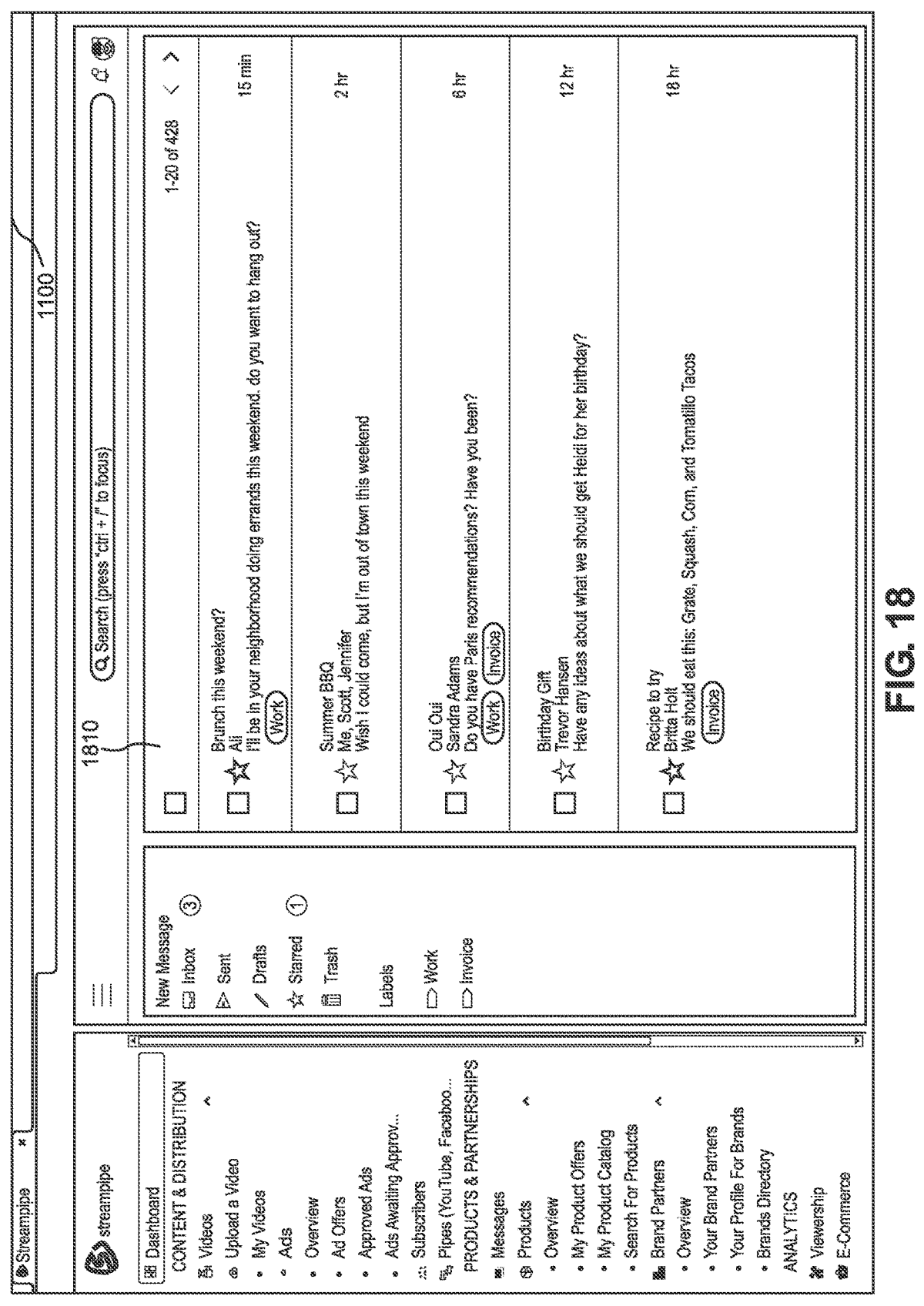

FIG. 18 presents one embodiment of the transaction platform user interface displaying a messaging screen.

Figure 19:
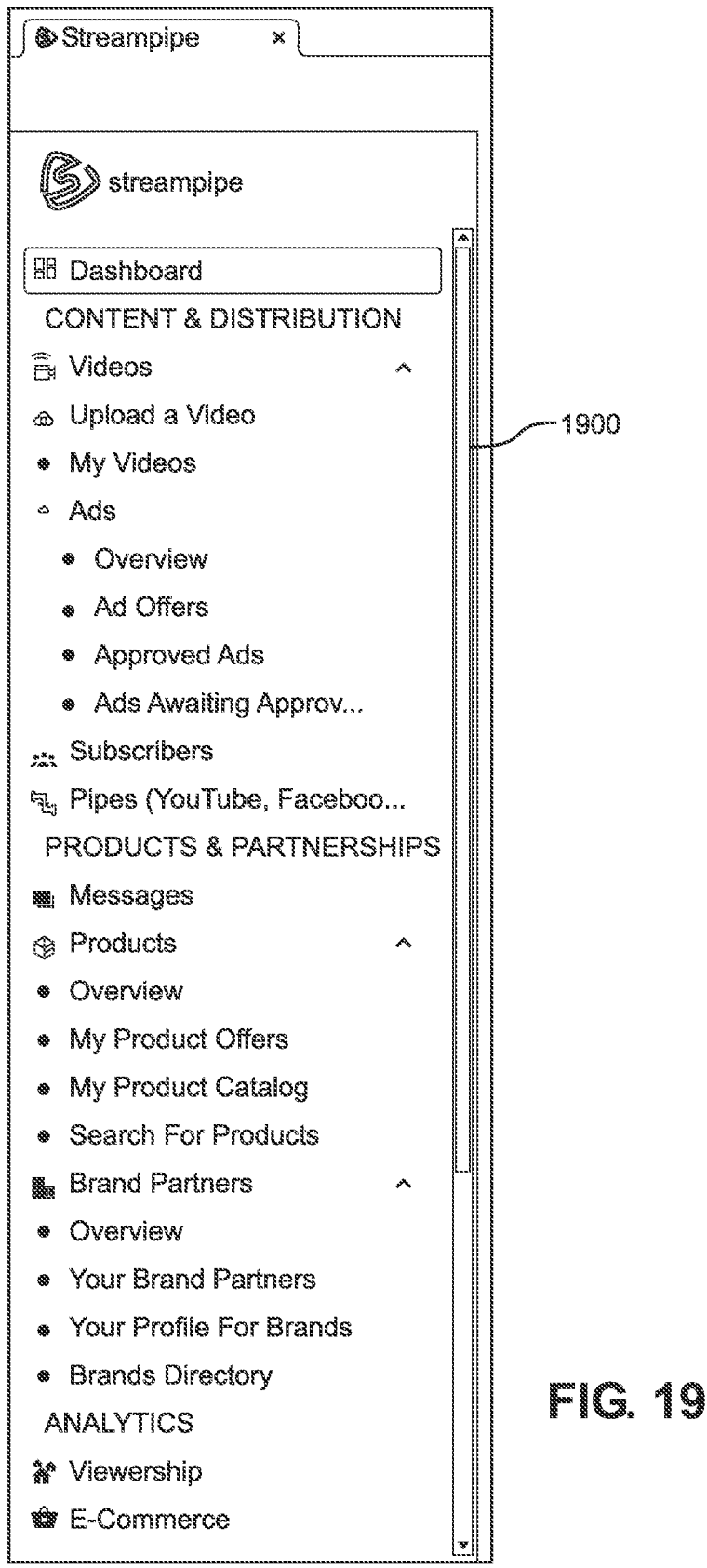

FIG. 19 presents one embodiment of a top half of a sidebar interface of the transaction platform user interface.

Figure 20:
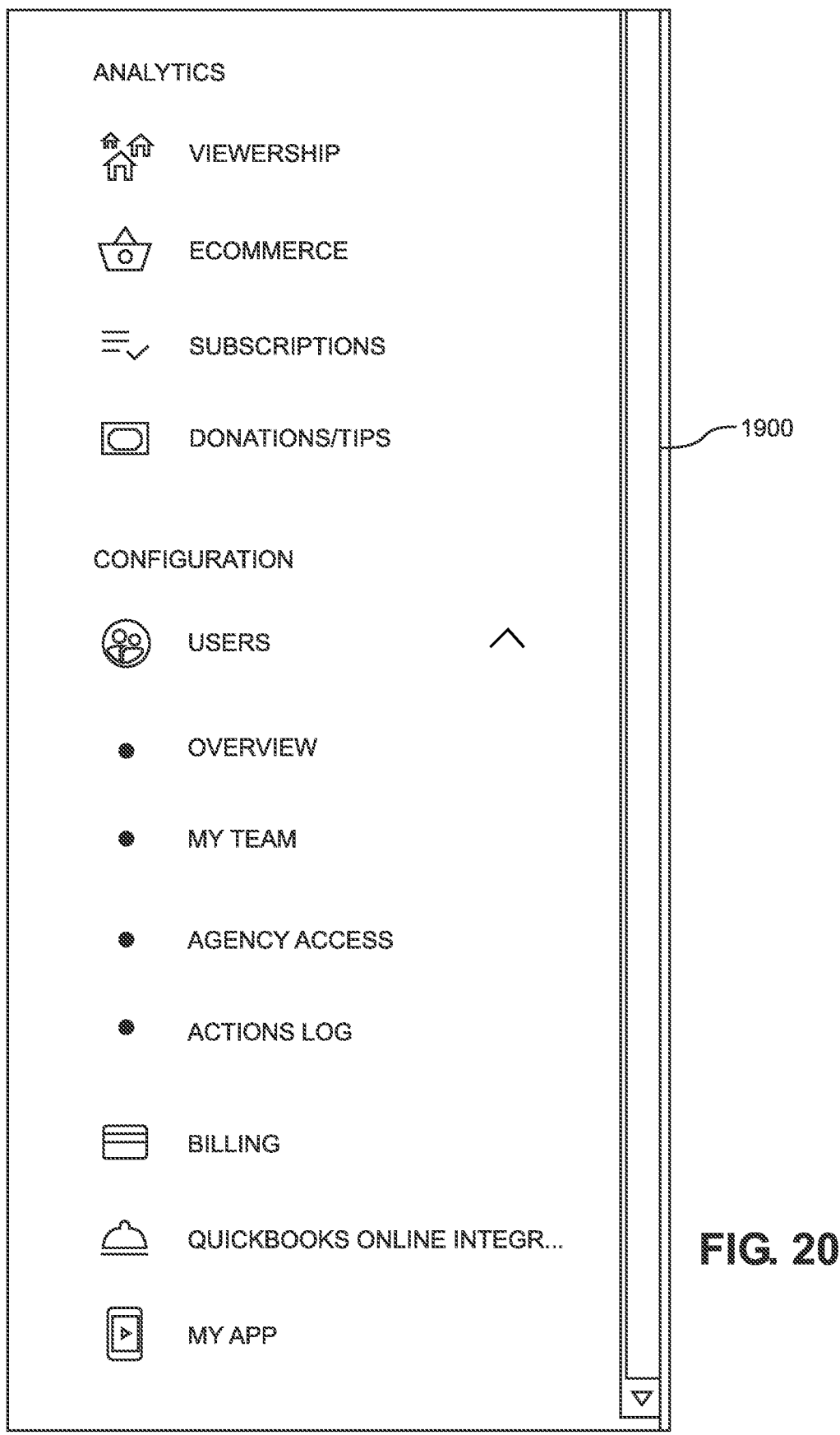

FIG. 20 presents one embodiment of a bottom half of a sidebar interface of the transaction platform user interface.

Figure 21:
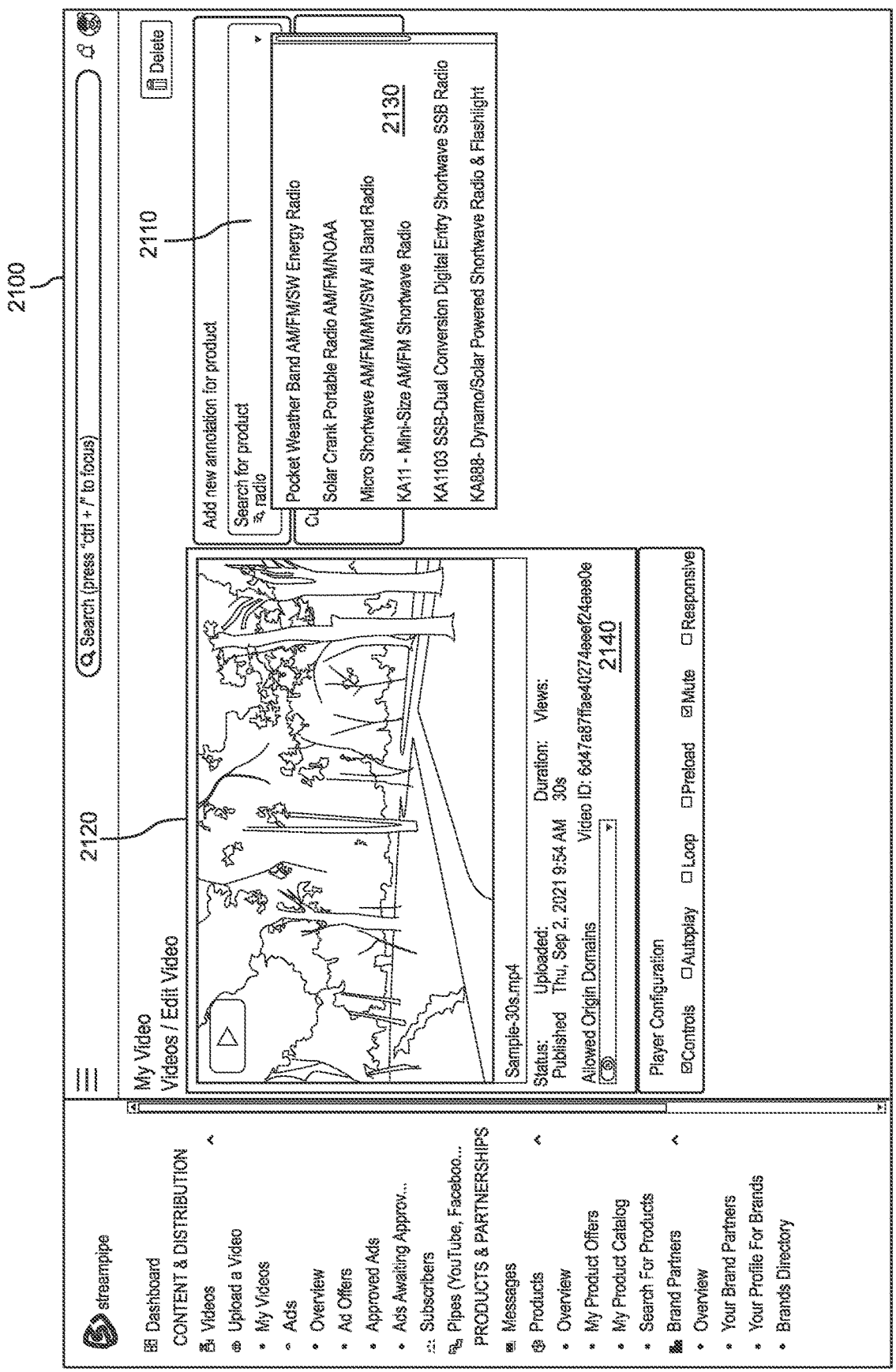

FIG. 21 presents one embodiment of a user interface for one step of creating a transaction invite on a video, linking a product or service to the video.

Figure 22:
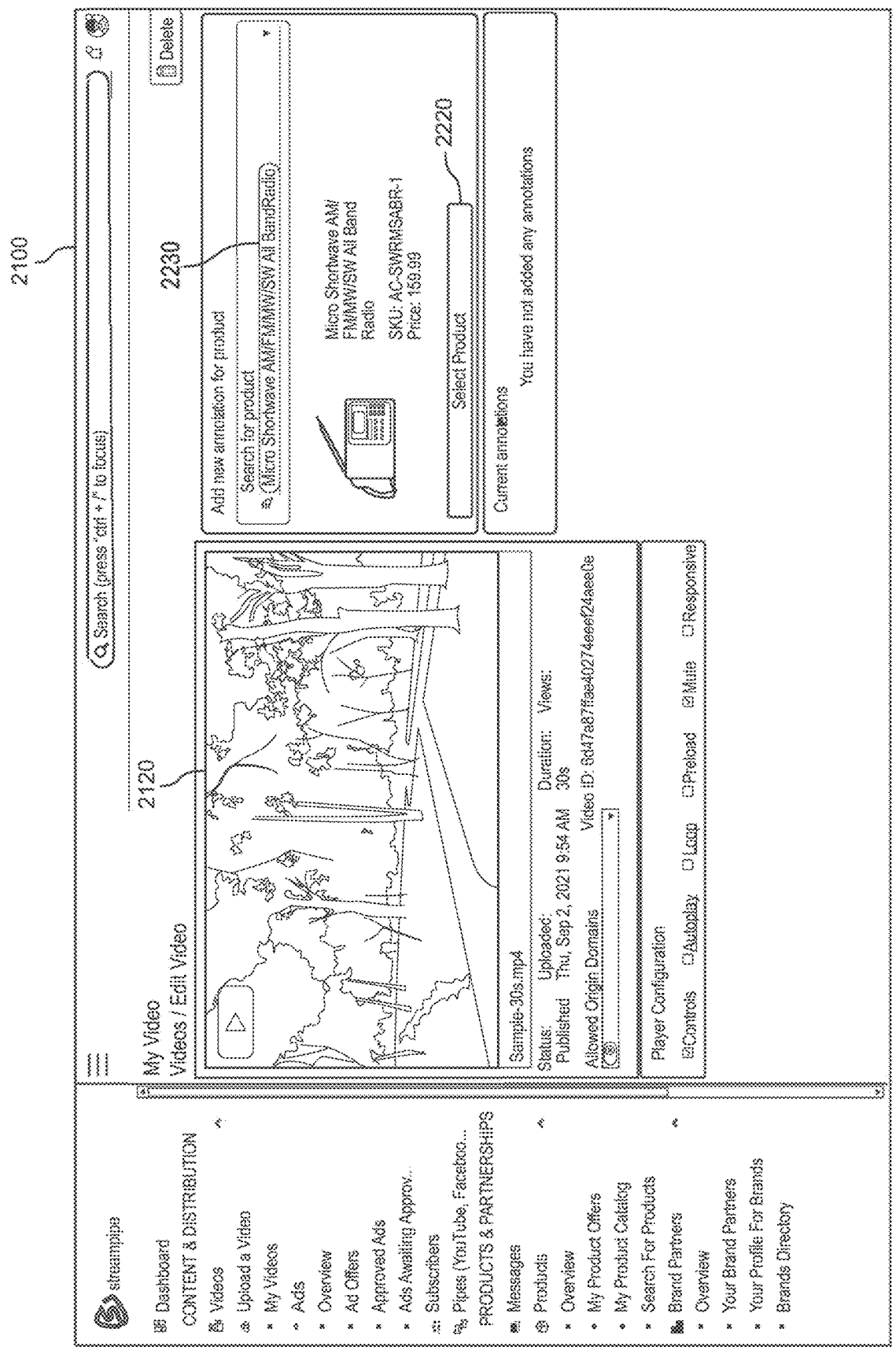

FIG. 22 presents one embodiment of a user interface for another step to create a transaction invite on a video, linking a product or service to the video.

Figure 23:
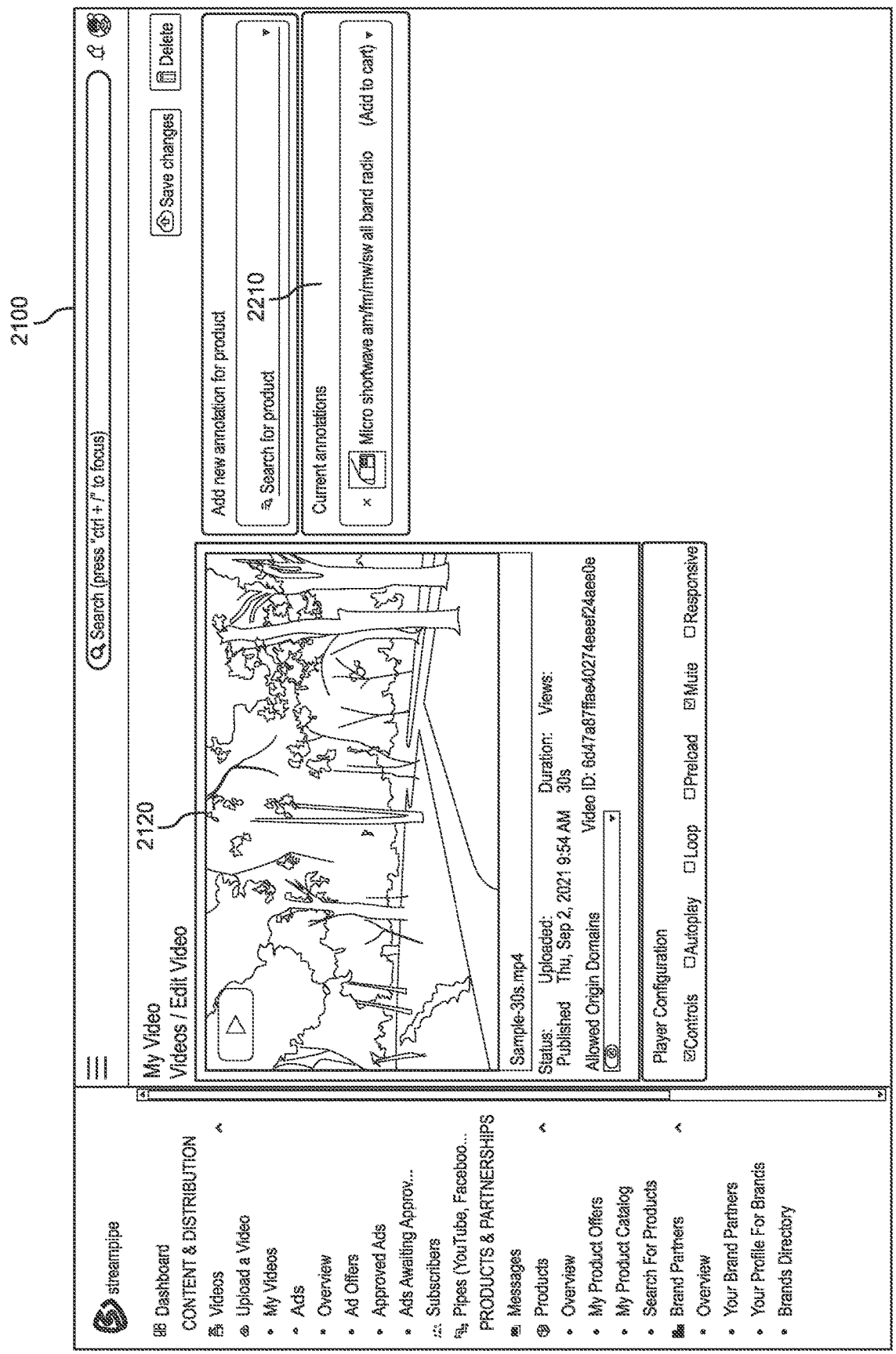

FIG. 23 presents one embodiment of a user interface wherein at least one product has been selected to be linked to a video.

Figure 24:
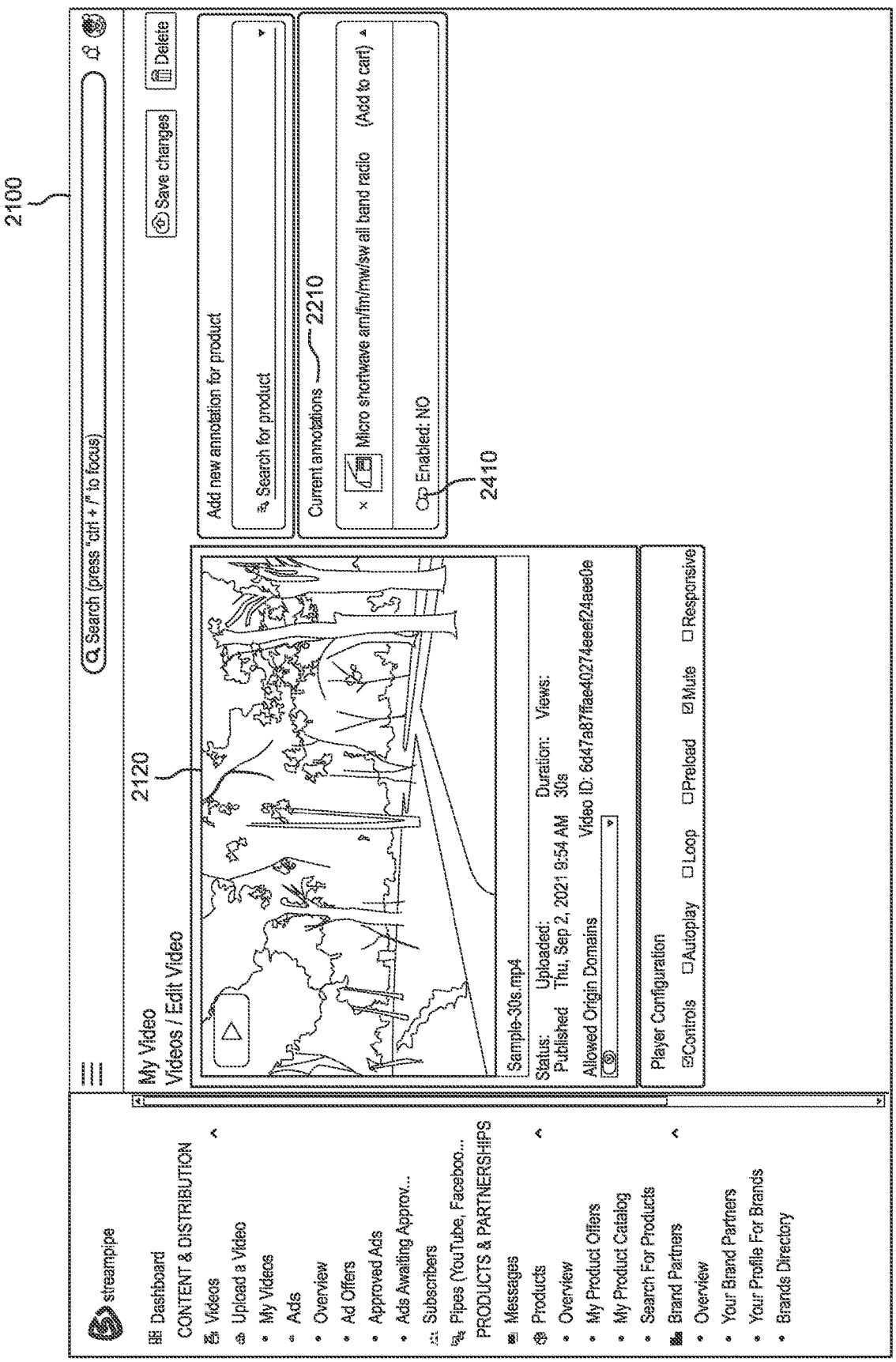

FIG. 24 presents one embodiment of a user interface that includes an interactive button or object for enabling customization of a transaction invite on a video.

Figure 25:
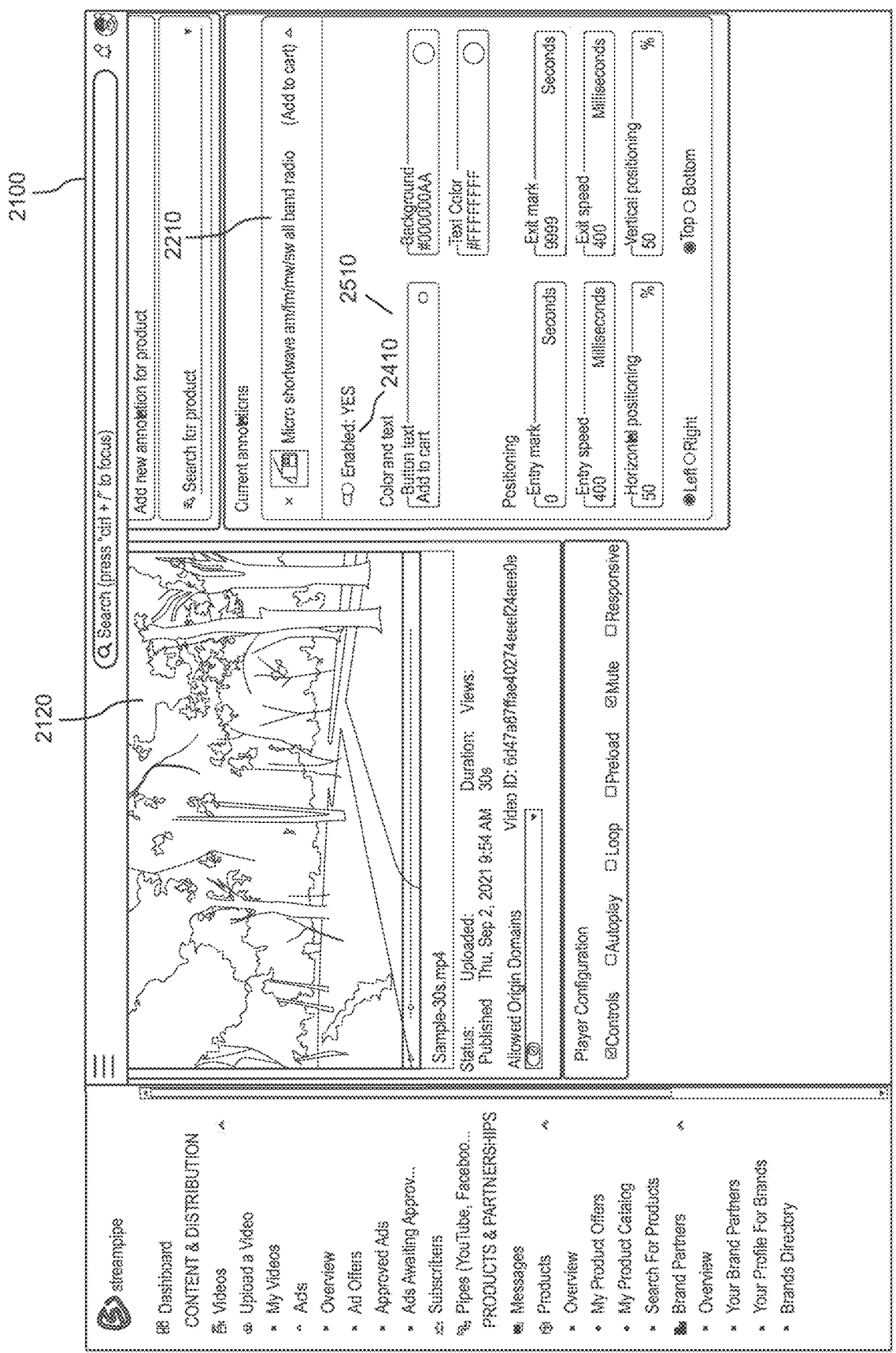

FIG. 25 presents one embodiment of a user interface to customize the transaction invite on a video.

Figure 26:
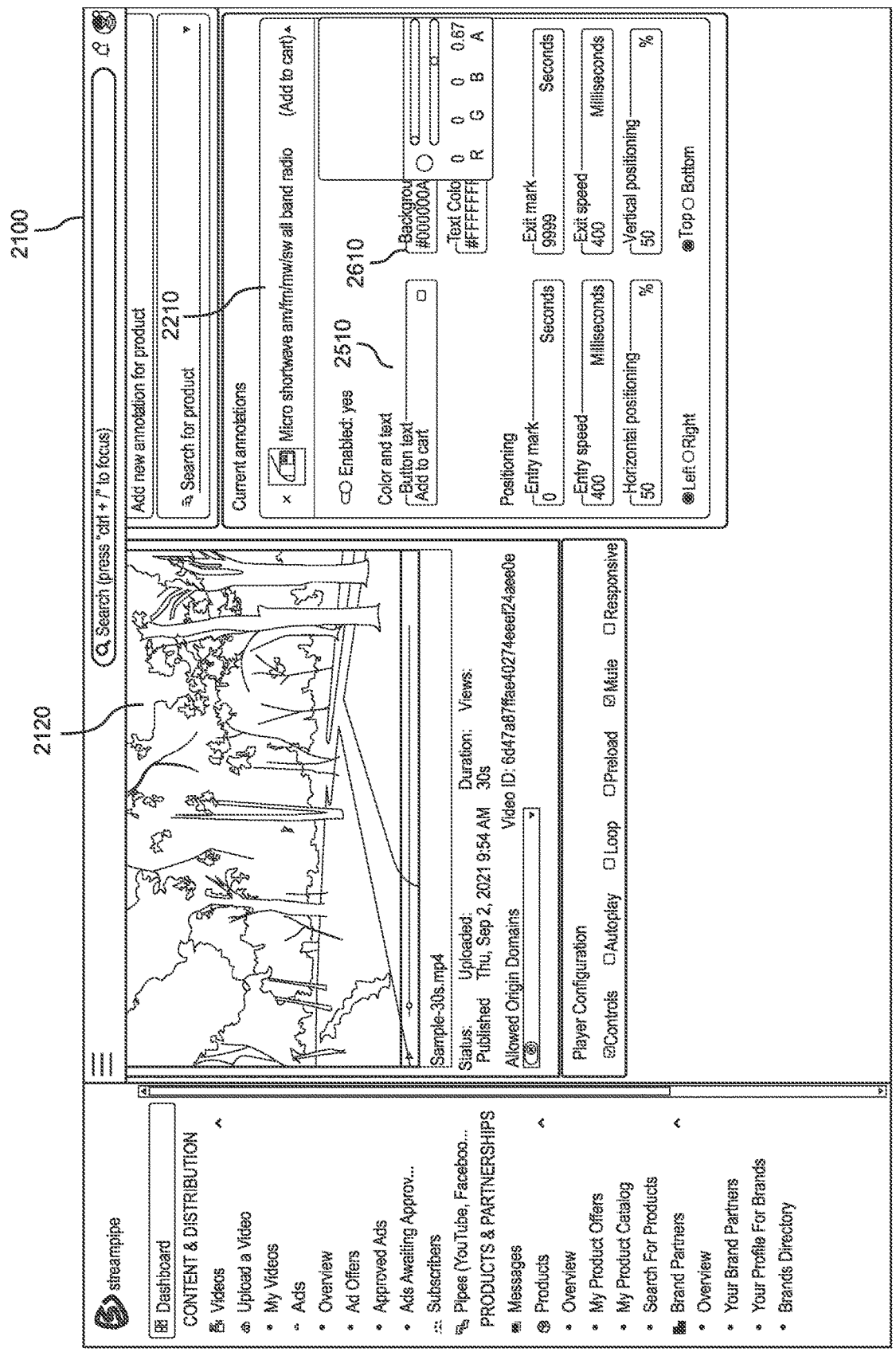

FIG. 26 presents another embodiment of a user interface to customize the transaction invite on a video.

Figure 27:
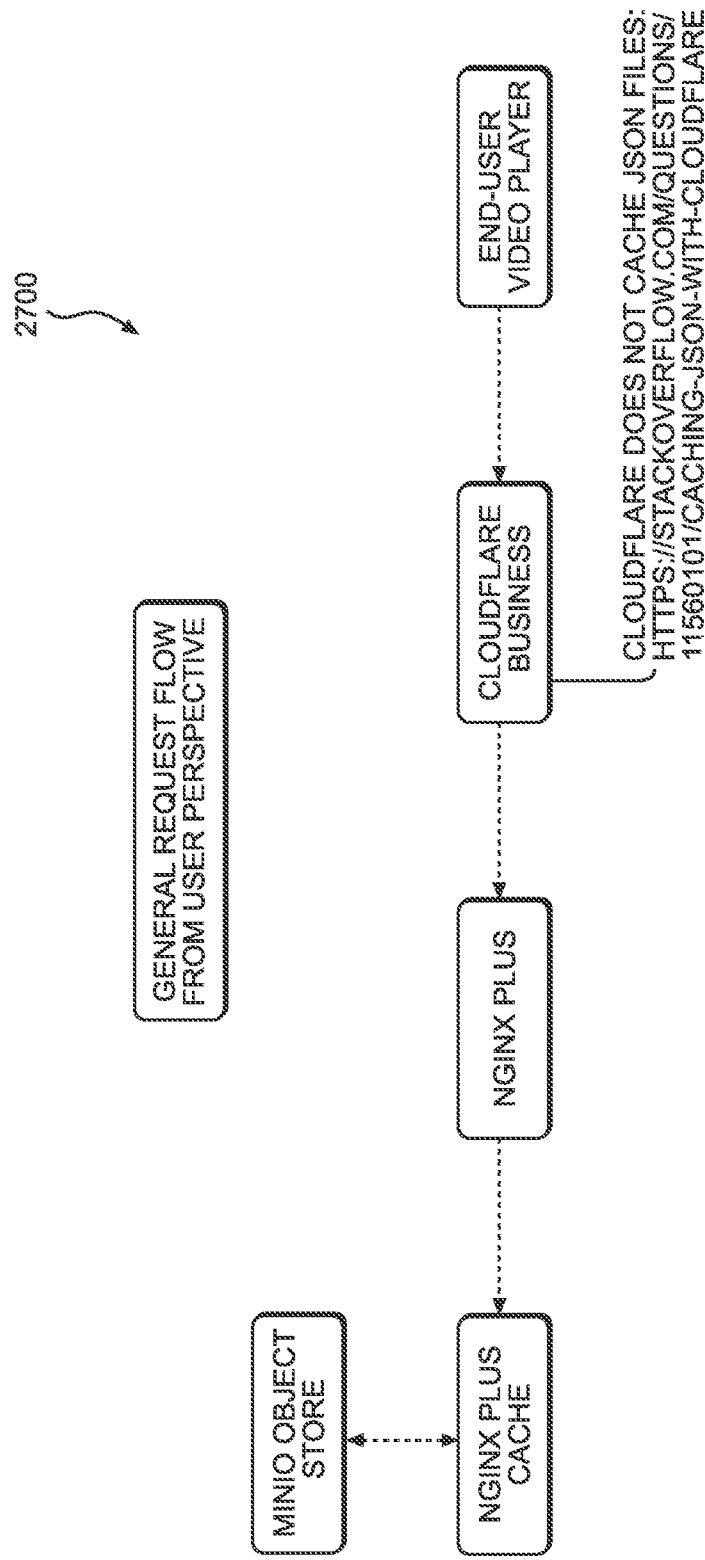

FIG. 27 presents one embodiment of the general request flow from a consumer device.

Figure 28:
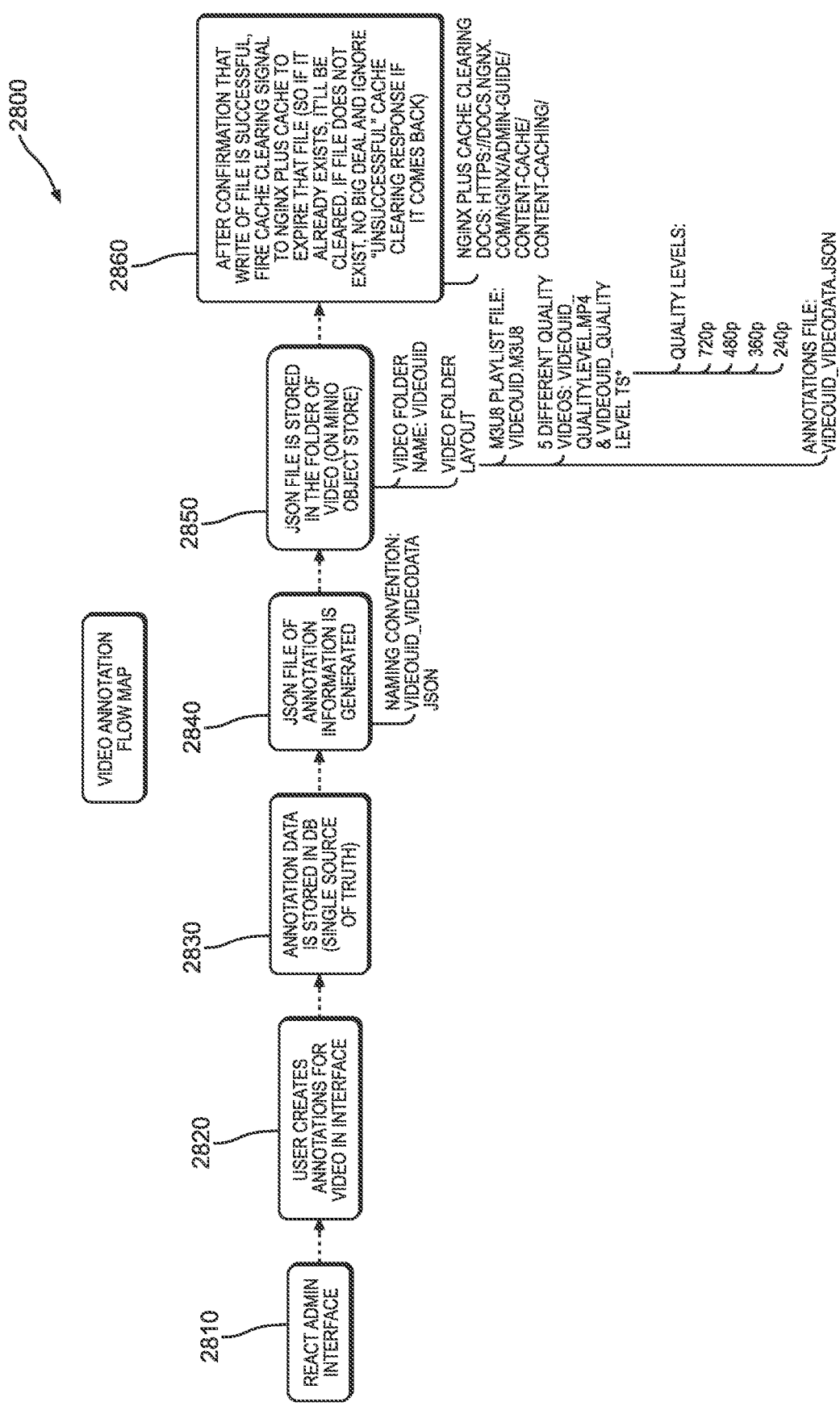

FIG. 28 presents one embodiment of a flow map for the creation of a transaction invite.

Figure 29:
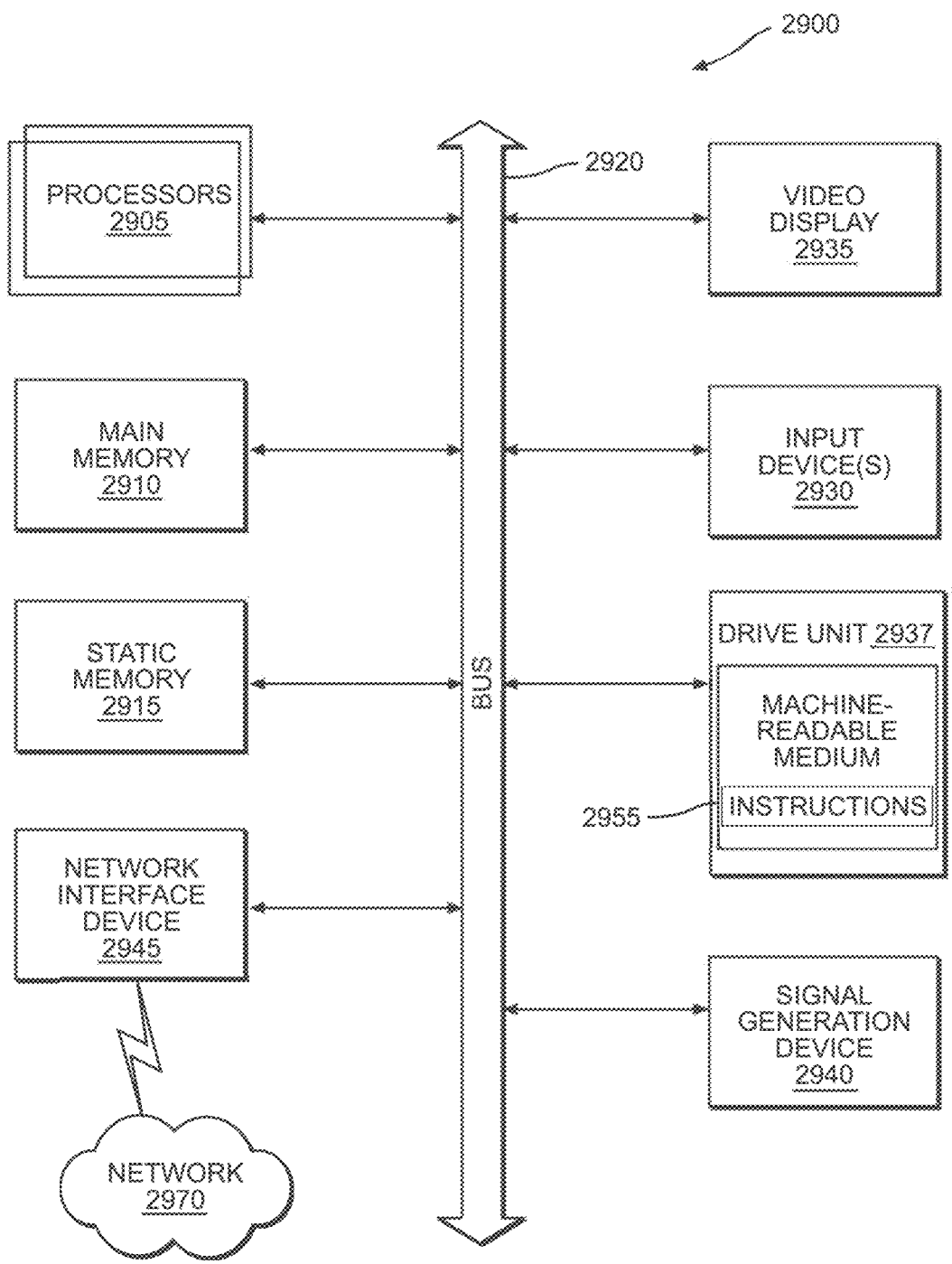

FIG. 29 presents a diagrammatic representation of an example machine able to perform all the methodologies presented herein.

Figure 30:
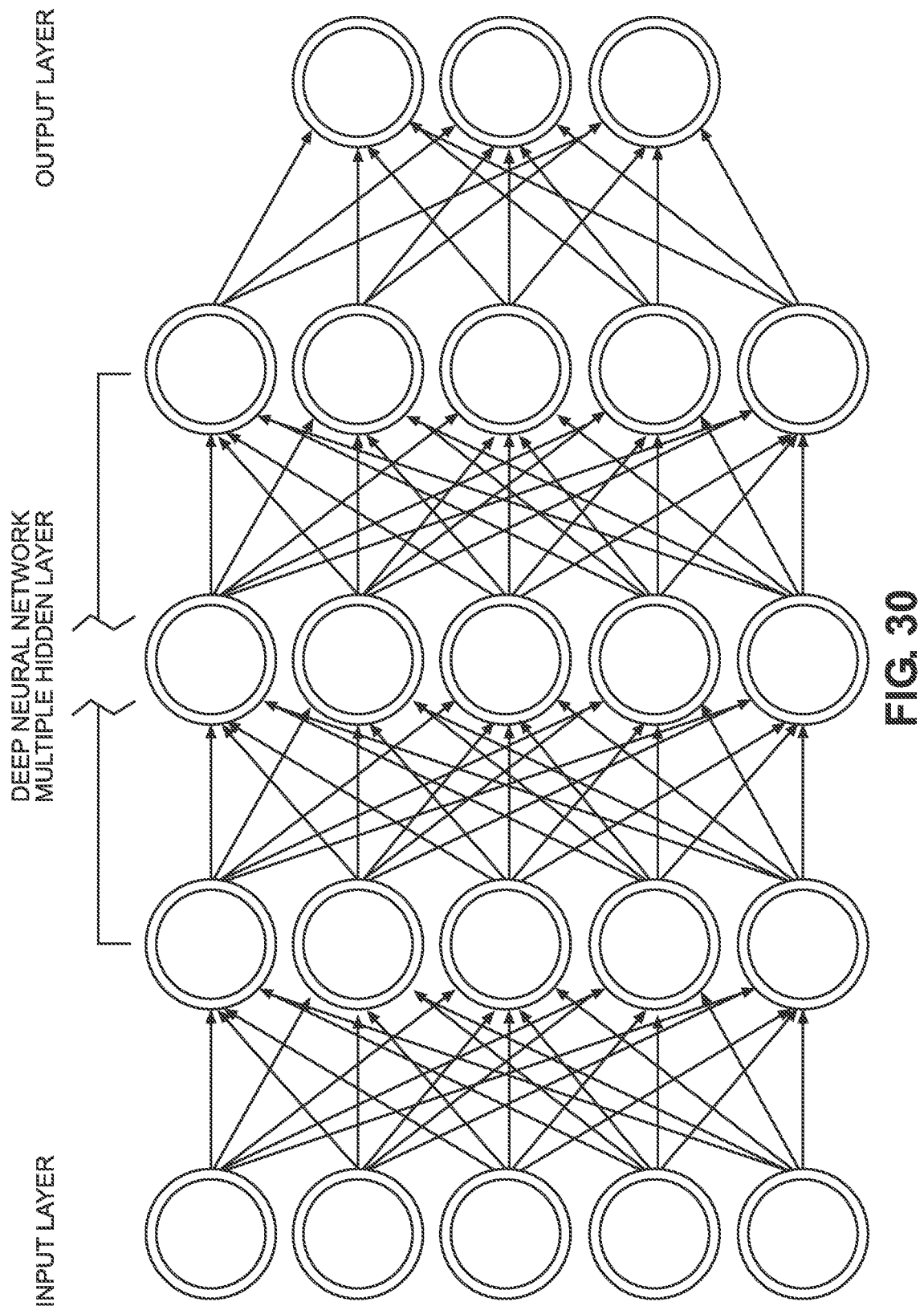

FIG. 30 presents an exemplary deep neural network.

DETAILED DESCRIPTION

Generally, a consumer of media content (the "consumer"), especially when watching a video, may be presented with a content creator, actor, product placement, or another type of promotion that recommends or suggests to the consumer the purchase of a certain product, the participation in a vote or a petition, answering a survey or question, liking or following a person, company or organization or undertaking any other kind of transaction (these are collectively referred to herein as "transaction" or "transactions"). Usually, the recommendation takes the form of an invitation to undertake the recommended action, by first clicking a link or a button that pops up on the video or other types of media. Sometimes the links are not on the video but around it, in another area of the screen. However, in all of these situations, once the user accepts the invite or takes the recommended action, for example by clicking a button, link, popup or clickable area that appears or is otherwise on the screen (collectively referred to herein as a "transaction invite"), the video being played immediately stops, disrupting the entertainment experience, and usually, a new tab, browser, or application is opened where the transaction would be conducted.

Consequently, consumers and users of media platforms may be discouraged from acting on a transaction invite while watching a video, and especially deterred from interacting with it and interrupting video playback at the parts that are most enjoyable to the consumer, even though those specific parts of the video may be the ones that are effective in triggering user desires for certain products or favorability towards the content of the presented transaction invites. The interruption of the video watching experience to conduct a transaction may lead to a smaller number of clicks or interactions with the transaction invite than otherwise could have been had with an uninterrupted video playback experience. When the desired behavior is for the user to engage in a transaction to purchase a product or service, a smaller number of interactions leads to reduced revenues.

It is also very difficult to attribute a click or interaction with a transaction invite back to a certain point in a video, a certain actor, individual, character, placed advertisement, audio clip and the like, because the video experience does not correspond with the commencement of a transaction, conducting the transaction and completing the transaction. As soon as a user clicks a transaction invite, the video stops playing, and a new window opens. This means that it is also difficult to attribute consumer transaction and purchase decisions to the correct part of a video, or the correct content or content creator that may have triggered the consumer to engage in a transaction. Thus, media and advertisement companies are not able to determine what part of a video, or who in the video, was most effective in generating a sale and driving the sale to completion, in turn generating revenue.

The technologies, systems, and methods presented herein (referred to interchangeably as the "transaction platform" or "media transaction platform") are directed to providing a seamless, simultaneous media consumption and e-commerce transaction experience. These technologies, systems, and methods allow the conducting of transactions via interactions with linked or associated videos or other media, as well as transaction interfaces, without any interruptions to the entertainment experience. The user is thus enabled to continue watching a video while, for example, conducting a transaction such as a product purchase. The methods and systems presented in this document can be applied to all forms of media being consumed by one or more consumers, including and not limited to video, pictures, slideshows, audio, games, text-based media, virtual reality (VR), augmented reality (AR), and extended reality (XR). Such media may be pre-recorded or presented in real-time, including via livestream.

Although reference to video playback will be made throughout this document, it should be understood that "media", as used herein, includes pre-recorded video, livestream video, pre-recorded audio, livestream audio, slideshows, and interactive digital visual displays. It should further be understood that this list is exemplary and not exhaustive.

It should be noted that "transaction platform" and "media transaction platform" are distinct from "media platform", which generally refers to a platform for uploading, converting, managing, and streaming media files over a network connection. In some embodiments, the transaction platform and media platform comprise one platform that serves the functions of both the transaction platform and the media platform. In alternative embodiments, the transaction platform and the media platform are distinct platforms supported by separate but communicatively linked servers or server networks. Similarly, in some embodiments, the transaction platform and media platform are managed by one single entity, while in alternative embodiments, the transaction platform and media platform are managed by separate entities.

In various embodiments, the media transaction platform includes a media player, such as a video player, that is used to display or play media to consumers. By way of the media player, consumers of the media navigate the platform, select creators and their videos and other media, and consume that media. Users partake in transactions via the transaction platform. In some embodiments, the transaction platform also includes an administrative side, available only to media creators, agencies, businesses, other entities and authorized users, administrators, or owners of a transaction platform account or transaction platform individualized application (collectively referred to herein as a "primary account user" or "account user"). The primary account user generally uses the transaction platform to create and upload videos, sell products and services, and provide and customize transaction invites that appear on video and other media they have uploaded to the transaction platform. Content uploaded to the transaction platform using the technology disclosed herein enables a consumer to transact and purchase a product or service while watching a video or consuming other media on the transaction platform.

In preferred embodiments, the transaction platform allows a video to continue to play on a user's desktop screen, or a mobile computing device, while the user is conducting a transaction that is associated with and originates from the video. In some embodiments, the transaction appears on, or is overlayed on the video itself while the video is playing. In some embodiments, the transaction occurs near the playing video on another part of the screen. The transaction originates with the video and is linked or associated with it and does not interrupt the viewing or media consumption experience by stopping or pausing playing media.

In several embodiments, standard video player behaviors are replaced by user input functionality that allows transactions to occur at the same time a video is playing, without interrupting, pausing, or stopping video playback. This functionality is generally applied in the form of a plug-in that is added to video players of several types, web-based and application-based, and running on different operating systems as well as various types of client devices, including desktop computers, smartphones, laptops and tablets.

In many embodiments, a live connection is established between a user's computing device, via a web browser, application or otherwise, to an e-commerce store such as Magento™ or Shopify™ once a transaction invite is clicked, pressed, or otherwise interacted with by a consumer. This is generally done by installing or running the transaction platform on the user device and connecting the user device through the transaction platform to the e-commerce store by way of an application programming interface (API), or multiple APIs or microservices. In preferred embodiments, connecting the client device to the e-commerce store through APIs is undertaken by using Cross-Origin Resource Sharing (CORS) headers.

It should be noted that while third party e-commerce stores can be integrated, e-commerce stores may also be supported by media platforms and content creators themselves, as well as by any party who implements the technology disclosed herein.

In some embodiments, user metadata is sent to the transaction platform database. In various embodiments a link to an e-commerce store is established between the user's computing device as soon as the video is played, and in other embodiments a link is created as soon as the video is accessed, for example by accessing a page which displays a yet unplayed video. In some embodiments, a universal player connects to an API endpoint of the transaction platform and then connects to different e-commerce stores individually based on the transaction that is occurring. This enables the transaction platform to interact separately with several merchant gateways.

The entire transaction, such as the purchase of a product, good, or service, occurs during video playback and is completed during playback without stopping the video, pausing it, or redirecting the user to any other location such as a browser, a browser window or tab, an application, or another web address. In various embodiments, this can occur on specially designed video players to allow simultaneous transactions during a video. In some embodiments, this is applied to all or any type of media or video player. In some embodiments, the video player is designed, created, and coded with, for example, Javascript such as VideoJS. Other design and programming languages are also used in alternative embodiments to provide the functionality of the transaction platform and its video player. In various embodiments any type of video player is utilized, including both web players and application players.

In preferred embodiments, the transaction platform and the media platform each operate on a serverless basis using a distributed server network. The distributed network ensures user queries and responses by the media platform and the transaction platform are directed to the nearest server configured to service a response. The nearest server then instantiates the code to enable a web interface to process the request and response. The use of the distributed network thereby ensures faster overall processing.

In most embodiments, a layered architecture model is used to enable the transaction platform and all functionalities. The transaction layer is separate from the video layer. The transaction layer enables all functionalities of commencing, conducting, and completing a transaction, including online purchase transactions that are linked to an e-commerce website. The transaction layer includes all elements of an online payment system, including product data recognition and identification, tax calculations, setting of user information such as shipping addresses and credit card or financial institution information, securing a transaction, and protecting the financial details of a buyer. This transaction layer may be transposed onto a variety of media and video players to enable the same functionalities across different languages, operating systems, video player designs, and different types of devices including smart phones and mobile devices, smart TVs, and different computing devices such as desktops and laptops.

In various embodiments, the platform transaction has its own customized video player that allows display of Hyper-Text Markup Language (HTML) content. The customized video player functions alongside the transaction layer to deliver the video stream and allow the transaction to occur without affecting or interrupting video playback.

The multi-layered architecture model employed in the design of the transaction platform allows each process, the video playback, and the transaction to occur simultaneously without bottlenecking each other. In some embodiments, each process runs as a different thread and is carried out in parallel. In such embodiments, each process is executed by a separate processor core or set of cores, improving the performance of a computing device, and utilizing memory more efficiently, per the needs of each individual process, than they would have if these two-layer processes were completely integrated and deployed as one unified application. This architecture also ensures maximization of the extensibility of the transaction layer to be integrated with various types of media players, browsers, and applications.

In some embodiments, the transaction platform provides content creators, or agencies that hire content creators, with information about attribution, such as who or what in the video triggered a consumer transaction. In various embodiments, each creator has their own dedicated application that ensures attribution of all the content to that one creator.

In some embodiments, as soon as a consumer accepts a transaction invite, a timestamp is created. Once the consumer commences with a transaction, another timestamp is created. Additional timestamps are created for every step of the transaction, including, and not limited to, inputting user information, selecting different product options or add-ons, as well as confirming and completing the transaction or purchase. The transaction platform then compares each timestamp with the video or other media being played and attributes each transaction event to the part or segment of the video corresponding to the timestamp. In some embodiments, this data is compiled and analyzed to provide creators and agencies with the ability to determine what or who triggered each transaction event. If, for example, a transaction event of accepting the transaction invite occurs at a high frequency when 'creator A' is on the screen, the agency that hires 'creator A' is notified to compensate that creator for their efforts commensurate to the revenues they produced.

In many embodiments, each part or segment of a video corresponds to specifically identified objects, which generally includes individuals and creators and the level of their involvement in the scene, as well as advertisements, product placements, pictures, audio, music, and other objects (collectively referred to herein as "specifically identified objects"). The creator of the video then proportionally divides up the revenue generated from a sale based on which specifically identified object was seen, heard, or otherwise noticed by the consumer at each step of the transaction process along with the statistical importance or significance of that specifically identified object to the scene or specific time period.

In various embodiments, a video creator (or agency or other administrator) manually allocates statistical importance or significance, such, a statistical value (for example points) to each part of the transaction process. In some embodiments, this assigned statistical value is based on the importance of the transaction step to the sale. For example, merely clicking the transaction invite may generate one point, but selecting a specific type of product may generate 3 points. Selecting an add-on may generate a point, inputting user information may generate 2 points, and confirming or completing a sale may generate 5 points. The revenue set aside to pay creators or other participants in the video from each sale is then distributed to those involved, appearing, or seen, heard, noticed, or mentioned in the video. Revenue is then proportioned and divided amongst the different specifically identified objects according to the statistical value of each transaction step. The statistical significance of each specifically identified object to each transaction step.

In various embodiments, the statistical significance of a specifically identified object is based on several factors, including and not limited to the specifically identified object's actions, location, prominence, or the importance of the individual or product, their placement, or position. If specifically identified object 'creator A' can be both seen and heard in one scene, they may receive 100% of the allocated statistical value, or points for that scene corresponding with a timestamp or transaction step. If however, a creator is only heard or only seen in a specific scene or during a specific period corresponding with a timestamp, then the creator or actor only receives partial statistical value or points. In some embodiments, other individuals, products, or triggers in the scene also receive a designated statistical value based on their importance to the scene or time period, and revenue is distributed accordingly.

In various embodiments, the transaction platform takes the form of an application, such as a phone application, a web application, or a desktop executable application. The transaction platform allows the user to link a bank account, credit card information, or any other financial institution product or service to the user's profile, the application, or a user identifier. Once the user initiates and completes a transaction, funds are transferred from the user's financial institution to the video or media creator's bank or financial institution, which is also linked to the application, their user profile or user identifier. This allows the transaction platform to transfer funds from a user to a creator via the platform once a user completes a purchase or payment. In various embodiments, bank institutions are linked to e-commerce stores that receive the money and transfer it to a user's or creator's account.

The platform offers creators several features to monetize, improve, personalize and promote their content. In preferred embodiments, if a media creator does not have a store selling a product or service, the media creator can log into the media transaction platform and customize their videos to show or offer consumers of their video or other media content a transaction with one or more products that are provided by the platform for sale. In some embodiments, the platform connects to other e-commerce stores and sells products on the other e-commerce stores' behalf through its content creators. If a consumer watches a video, and if a transaction invite is triggered and the transaction is completed, the creator receives a percentage of the revenues. The creator may thus receive revenues via the transaction platform despite not having their own product line or store.

In various embodiments the transaction platform takes one or more different forms or formats. In one form, a creator or administrator is provided an individualized application solely for their own use and their own content. The application is generally downloadable from an app store, such as the Apple™ or Android™ stores. In various embodiments, a specific web address is provided to each creator where their content is hosted. In other embodiments, creator data is hosted on designated servers or AWS and other cloud services. The content is accessible via different methods, including designated applications for each content creator, or a general application able to access all content creators, browsers, websites, as well as other types of webservices.

In some embodiments, the systems and methods herein further include a method of training a neural network for automatically collecting, analyzing, and transmitting data to content creators and other users of the transaction platform.

The training includes collecting a set of data related to a user when the user initiates a transaction by way of the transaction invite. This information generally includes the user's name and user profile, as well as age, biographical information from a user profile, and demographic information.

In some embodiments, further historical information is collected and used to train the neural network. Historical information generally includes the user's transaction history, types of purchases made, types of transaction invites that the user has dismissed, and any first time or repeat purchases.

Video data is collected from the video in which the transaction invite was displayed, and the transaction was completed. Such video data is used in conjunction with historical data to train the neural network. Video data generally includes points of maximum or minimum viewership and points at which transactions were initiated, completed, or dropped, as well as the type of content presented at the time of the transaction.

In some embodiments, video data further includes video transcripts, which may be submitted by content creators or, alternatively, processed by a pre-trained model for automatic speech recognition (ASR) and speech translation.

For example, if a particular person such as an actor, public figure, content creator, or guest is shown during a segment where transactions are completed at a high rate relative to other transaction invites on the platform, the platform may attribute successful sales or transactions to the particular person shown at the time of the transaction invite. Similarly, in some embodiments, the system collects data regarding successful sales when a visual or audible cue is given in a video, such as a logo, symbol, or illustration being shown; a slogan or jingle being played; or a particular subject being raised during the video playback.

By further example, in some embodiments, by training the neural network on viewership data and transaction data, the system determines an optimal time during video playback to insert an advertisement into the player. Again, this determination is made using training and tuning from data collected regarding, for example: viewer demographics, previous purchase history, viewing history, device type, and if available, personal details such as name, gender, identity, and income level. The determination of optimal placement in time during playback greatly increases the opportunity for content creators, media platforms, and e-commerce platforms to maximize sales within video streams.

Information collection and analysis, including analysis by machine-learning methods, can be used to reduce costs to sellers using the transaction platform, including acquisition costs of new customers. Further, metrics such as engagement, sales, and successful transactions can be maximized using associations generated from the data analysis, including precise targeted advertising and invite placement by timing, or by visual or audible cues within media content.

In some embodiments, the machine learning techniques for transaction optimization include a large language model (LLM). An LLM is a type of artificial intelligence model that is trained on a massive amount of text data, such as text from books, articles, websites, or any other source of text. The LLM learns the patterns and structure of the text data, and it can then use this knowledge to generate new text, translate languages, write different kinds of creative content, and answer questions in an informative way.

Neural network architecture allows for parallel processing and can be used by large language models to process data and generate contextually relevant responses. For example, transformer architecture consists of a series of layers, with each layer consisting of parallel processing components called attention mechanisms and feedforward networks. The attention mechanisms weigh the importance of each word, using statistical models to learn the relationships between words and their meanings. This allows LLMs to process sequences in parallel and generate contextually relevant responses.

For example, using LLM functions, a content creator or other user of the transaction platform may submit a video transcript and user data from a particular video and submit a query in plain text, such as "based on this user data and this video transcript, what should I sell in my next video?" In response, the system returns a response in plain text: "Since your last video performed well with viewers in the 18-24 age group, you should consider offering the following items on your next video:", along with a list of transaction invites to be implemented.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents a diagrammatical representation 100 of one embodiment of the relationship between the different components of the systems described herein. Here, the transaction layer 120 contains the basic functionalities of the transactions for conducting a transaction extensible to any video or media player. The custom user interface, or Custom UI 115 is also separated from the basic functionalities of the transaction layer 120 and integrates with transaction layer 120 through an API. Custom UI 115 controls the interface of the transaction layer 120 overlayed on the video, allowing a user to customize font, text, background, text color, and other aspects that affect the look of the interface. In various embodiments, the transaction layer 120 connects to the media player 130 via a custom API. The media player is installed and capable of being played on a multitude of consumer user devices 140. User devices 140 include several types of media viewing devices, such as televisions, computing devices such as smart phones, tablets, desktop computers and laptops as well as VR, AR, and XR headsets and viewing devices.

FIG. 2 presents a flow diagram of one embodiment of a method 200 to conduct a video-linked transaction concurrently with video playback. Optionally, a video must be prepared 210 by a creator, user, or administrator. Alternatively, a video is prepared with transactions automatically associated by the transaction platform. This preparation includes uploading the video and adding the relevant transaction or transactions, as well as transaction invites (preparing a video's transactions and transaction events 210). Each transaction added to the video will have a time stamp where the transaction invite appears, and each time stamp will be linked to a specific type of transaction, including but not limited to a purchase of a product or service, a lease, subscription to a product or service, purchase of a ticket to an event, transfer of purchased tickets, delivery of a product or service, voting in an election, signing of a petition, joining or liking an individual, organization or business and their public social media profiles, webpages and events, as well as other promotional activities. The now prepared or pre-prepared video is played 220 via a designated video player.

In some embodiments, this video player is part of the transaction platform. Alternatively, the video player is a separate independent player. While the video is being played 220, one or more transaction invites are displayed 230, enabling the media consumer to initiate and complete a transaction. If the user interacts 240 with one or more of the interactive invites, then the transaction invite that was accepted, acted upon, or interacted with, displays 250 one or more transaction interfaces. In some embodiments, the transaction interfaces are consecutive to each other. In alternative embodiments, the interfaces are all displayed at once. The transaction interface allows a consumer to undertake and conduct the transaction during the playing of the video. Even if the video ends, the transaction is not affected and can still be completed 260 once it has been initiated during the playing of the video.

FIG. 3 presents one embodiment of a video player of the media transaction platform with an initial transaction step 300. This video player is viewed by a media consumer and allows transactions to occur during video playback. A transaction invite 310 is displayed during the playing of the video, inviting a user to buy a tactical flashlight, and provides a button to press or click on to initiate the transaction during video playback. The video player controls and running time 320 here are placed at the bottom of the player. In some embodiments, a session is initiated, and connection is established between the transaction platform on the client device and an e-Commerce store when this initial transaction invite 310 is clicked, pressed, or otherwise interacted with.

FIG. 4 presents one embodiment of a video player of the transaction platform with a second transaction step 400 of displaying the user's cart 410 after the user has clicked on a purchase transaction invite. In this full screen mode, the video player hides any video player controls and running time. In some embodiments, a session is initiated, and connection established between the transaction platform on the client device and an e-Commerce store when the cart 410 is clicked, pressed, or otherwise interacted with. In some embodiments, products are added to a guest user cart 410.

FIG. 5 presents one embodiment of a video player with a checkout transaction step 500. In this embodiment the video has continued to play as displayed by the video controls and progressed video running time 520, while a user or consumer is conducting a purchase. After the user clicked on their cart 410, the transaction interface 510 expands to display the item in the cart 410 that is being ordered. In some embodiments, a session is initiated, and connection established between the transaction platform on the client device and an e-Commerce store when this transaction interface 510 is clicked, pressed, or otherwise interacted with.

FIG. 6 presents one embodiment of a video player at a user input step 600 with a user input transaction interface 610. As the video is playing, the user has checked out their ordered products and is presented with a transaction interface 610 to input user information, including email, full name, and shipping address. In various embodiments, once information is added by the consumer to user input transaction interface 610, the initial guest account order is converted to an order populated by the information provided by a consumer.

FIG. 7 presents one embodiment of a video player at a delivery method transaction step 700 with a delivery method interface 710. In this embodiment, the user can select the shipping method and method of delivery tier and price during video playback.

FIG. 8 presents one embodiment of a video player at a payment transaction step 800 with a payment transaction interface 810. In this embodiment, the user is inputting the credit card or other payment details in the payment transaction interface 810 during video playback. Once the user or consumer inputs the payment details, they can finalize the order on this payment transaction interface 810.

FIG. 9 presents one embodiment of a video player during a transaction completed step 900 displaying the transaction interface confirming a completed transaction 910 during the playback of the video. The user may close the transaction interface and watch the video with the transaction interface being removed from display.

FIG. 10 presents an embodiment of a main dashboard 1000 as part of one embodiment of the user interface of the transaction platform, allowing an account user access to configure videos and the transaction platform within the creator or administrator section of the transaction platform. It should be noted that there may be more than one creator or user on each account—for example, for accounts with multiple account users. The main dashboard 1000 is accessible in various embodiments as an application, website, web address or web account of an account user or users.

In exemplary embodiments, on the main dashboard 1000, an account user views one or more income and sales interfaces 1010 which provide information on the income and sales generated for different time periods. For example, the user may view income and sales from the last 7 days, 30 days, or the last year, as well as the total life earnings of the account or life earnings of the one or more of the creators on the account. These time periods are modifiable to other period lengths or to encompass specific dates. In some embodiments, the main dashboard 1000 includes a message center 1020 allowing an account user to view the messages sent to them and to respond or access specific messages.

In some embodiments, a product or product offer section 1030 is also displayed on the dashboard. The product or product offer section 1030 summarizes the products the creator or account is selling or advertising in their videos, and the profits made on each of these products. In product or product offer section 1030, the account user is enabled to add new products to be sold. Such products are then enabled to be presented in videos, and samples of each product can be made available.

Finally, in some embodiments, a sidebar navigation interface 1040 is included on one side of the screen to allow navigation through the transaction platform. This sidebar navigation can be hidden by the user. All the different parts of the main dashboard 1000 as well as the transaction platform are customizable by the user, as well as font, text, background, or text color. Customization of the main dashboard 1000 is generally controlled and customized via APIs. Access and customization can be undertaken programmatically rather than through the provided UI, per an account user's preferences.

FIG. 11 presents an embodiment of an actions log 1110 as part of some embodiments of the transaction platform user interface 1100 for an account user. In the embodiment shown in FIG. 11, the navigation sidebar is hidden. The actions log 1110 records or logs actions taken by any account user that has access to the account. In many instances when an account is owned by an agency, organization or multiple people, there are multiple individuals with access to the transaction platform account. The actions log 1110 records all information to keep record of actions taken by these different parties. Information that is recorded may include the user identification (user ID), the date an action was taken, what type of action or action group the action belongs to, the action name, the Internet Protocol (IP) address, username, email of the user as well as other notes or details. Each of these may be expandable with further details about the action viewable once each action listing in the log is opened or expanded. In this screen, the account user may still access other menus, including user settings and options 1120.

FIG. 12 presents an embodiment of an upload video screen 1210 as part of some embodiments of the transaction platform user interface 1100 for an account user. The upload video screen 1210 allows the opening of files as well as dragging and dropping files to be uploaded.

FIG. 13 presents one embodiment of an uploaded videos screen 1310 as part of some embodiments of a transaction platform user interface 1100 for an account user. The uploaded videos screen 1310 includes the videos that a user or account has uploaded, and a user or admin can access each video, edit it and the transactions it is associated with, as well as delete or share the video.

FIG. 14 presents one embodiment of an access settings screen 1410 as part of some embodiments of the transaction platform user interface 1100 displaying access settings. In the access settings screen 1410, user permission levels such as owner, super-admin, or admin with different access privileges can be set. Specific users can also be created or deleted on this screen. In this embodiment, the access settings screen 1410 is designed for an account user to be able to determine who can and who cannot undertake certain actions, and who has and does not have specific access levels.

FIG. 15 presents one embodiment of a team member screen 1510 as part of some embodiments of the transaction platform user interface 1100. The team member screen 1510 includes the team members of a user account. In some embodiments, the team member screen 1510 lists each team member's identification number, email, names, roles, dates their accounts were created, when they signed in last and whether the account is disabled or not. Each of these listed team member entries on the screen is expandable to provide further information.

FIG. 16 presents one embodiment of an overview screen 1610 as part of some embodiments of the transaction platform user interface 1100. The overview screen 1610 includes the team members of a user or creator and lists each team member's identification number, email, names, roles, dates their accounts were created, when they signed in last and whether the account is disabled or not. Each of these team member entries on the screen is expandable.

FIG. 17 presents one embodiment of a transaction platform user interface 1100. The transaction platform user interface 1100 displays a notification bar 1710 which pops up or down when a message is received, or another event or activity in the transaction platform occurs.

FIG. 18 presents one embodiment of a screen displaying a messaging interface 1810 for a transaction platform user interface 1100. Messages are displayed in different orders, along with the option to create, delete, or draft new messages or folders to be sent from the user account.

FIG. 19 presents a top half of a navigation sidebar 1900 for one embodiment of the transaction platform user interface. This navigation sidebar 1900 allows an account user to navigate to a video section where a creator or administrator may upload a video, a 'My Videos' section where one or more videos are listed, an expandable advertisement section with an overview section, a section for advertisement offers that a user or creator has received, advertisements that have been approved and advertisements awaiting approval. A subscriber's section allows a creator or administrator to view a list and information about their subscribers, including analytics, levels of engagement, growth, and other statistics. A 'Pipes' section allows a creator to connect their videos to online and social media platforms and produce links and gateways through custom APIs to each social media account. This allows any video of the account user that has been published or uploaded on a connected social media platform or other webservices to be connected in the transaction platform application or web address location and play that video along with the transaction invite and corresponding transaction if the video triggered or the video has been played on the social media platform. In various embodiments. In some embodiments, playing or clicking a video on a social media platform serves as a trigger to launch the video and the associated transactions on a transaction platform.

In some embodiments, the navigation sidebar 1900 also allows navigation to a 'Products' section, where an account user can access an 'overview' containing summaries of all their interactions with various products and services. The overview includes various breakdowns, such as what the account user(s) are selling, comparisons between multiple account users of one account as well as comparisons of the products sold across different individuals, businesses, or creators. Summaries and comparisons of data also include products sold, revenues generated, future revenue estimates, as well as information on the most effective videos selling products or services. A 'My Product Offers' section provides users and administrators with listings of the products or services that are offered to them by companies, businesses, agencies, and the like to be presented and sold on their page. A 'My Products Catalog' section in the transaction platform may list all currently sold products by the account, as well as corresponding profits. A search of the products category also allows an account user to search for products to place in his or her videos.

The navigation sidebar 1900 may also include the ability to navigate to a 'Brand Partners' category in the transaction platform which includes an overview of the partners as well as their connection to products, revenues and certain videos or creators. There is a 'Your Brand Partners' category which includes a listing of all the brands currently partnering with an account or users of an account. A section includes the account users' profiles for brands and brand partners. In some embodiments, the interface also includes a 'Brand directory' to allow users to look up brands or filter them by category or other categorizations.

FIG. 20 presents one embodiment of the bottom half of a navigation sidebar 1900 of the transaction platform. In some embodiments an analytics section allows account users to gain data on their viewership, their subscribers, their e-commerce business, as well as any donations or tips received from others. The sidebar interface also allows access to a 'configuration' section whereby a user is enabled to access the user overview, team, access and actions log pages from this navigation sidebar 1900. In some embodiments, the transaction also includes a billing section, an online integration section with other applications and media formats, as well as links to the mobile version of the application.

FIG. 21 presents one embodiment of a user interface for one step of creating a transaction invite on a video, linking a product or service to the video. In this embodiment, a transaction platform user interface 'My Videos' screen 2100 includes a product search bar 2110 where product names are entered, and different products or services are searchable. Based on user inputs in the product search bar, suggested results are provided in a drop-down interface 2130 that the user may select from. In various embodiments, the account user input calls information obtained from linked or connected e-Commerce stores, their databases or servers holding cached e-Commerce data, as well as from compiled or collated product catalogues, that in some embodiments are in designated transaction platform databases. In some embodiments this is implemented by using AJAX calls to pull product information from these sources.

This 'My Videos' screen 2100 also includes the designated video 2120 that the account user is linking to a transaction. Information 2140 about the video is provided and, in some embodiments, includes the status of the video, date of upload, its length or duration, the number of views it has received, and allowed origin domains. In various embodiments, the user interface in the 'My Videos' screen 2100 as well as other parts of the transaction platform uses drag, drop, and click actions. The user interface enables an account user to quickly customize and create transaction invites using any device available to the account user and which the transaction platform may run on, including smartphones, tablets, laptops, as well as desktop computing devices.

FIG. 22 presents one embodiment of a user interface for another step to create a transaction invite on a video, linking a product or service to the video. In this step the account user has clicked on a product listing 2230 that was provided in a search result and is now selected in the search bar. A details and selection interface 2220 is presented to the user on the 'My Videos' screen 2100 which, in some embodiments, includes details on the product's full name, identification or serial number, product number, product information and price. The account user can confirm the linking of this product to the video 2120 to be offered to consumers of the video as a transaction invite.

FIG. 23 presents one embodiment of a user interface wherein at least one product has been selected to be linked to a video. 'My Videos' screen 2100 includes a 'Current Annotations' section 2210 wherein currently linked products and services to the video 2120 are displayed.

FIG. 24 presents one embodiment of a user interface that includes an interactive button or object for enabling customization of a transaction invite on a video. 'My Videos' screen 2100 includes an enablement button or lock 2410 to enable changing the configurations, and display settings of video 2120 when activated by an account user.

FIG. 25 presents one embodiment of a user interface to customize the transaction invite on a video. Once enablement button or lock 2410 is turned on, a transaction invite customization interface 2510 appears. The transaction invite customization interface 2510 allows a user to modify the text of the transaction invite, its background color and text color, its positioning, the timestamp in the video which the transaction invite appears, the timestamp in the video where the transaction invite disappears, the speed at which the transaction invite enters or exits the screen, the horizontal and vertical positions of where the transaction invite for the linked product displayed in the 'Current annotations' section 2210 is placed on the screen of the video 2120.

FIG. 26 presents another embodiment of a user interface to customize the transaction invite on a video. The account user can change the background color of the transaction invite to be displayed on the video 2120 via a background color option 2610 which expands to display a range of color schemes that can be selected by the account user within the transaction invite customization interface 2510.

FIG. 27 presents one embodiment of the general request flow 2700 from a consumer device when conducting a transaction. In this embodiment the consumer initiates and completes the transaction via the transaction invite and transaction interface provided by the media transaction platform on the client device. The consumer's client device connects directly to the e-Commerce store to conduct the transaction initiated on the client device by interacting with the transaction invite. The connection between the client device and the e-Commerce store may be facilitated by a content delivery security network, such as Cloudflare, whereby consumer/customer information and instructions are protected from external security threats and attack vectors. Client device instructions and data are sent through an API gateway. This API gateway allows the flow of data to and from the e-Commerce store and the client device to a caching server which may save e-Commerce store information and information about products, as well as information that may be repeatedly sought by customers and customer transaction requests that repeat. The cache server may update and delete information periodically so that it remains current. If the response or information sought is not cached then the information is requested from the e-Commerce store directly, which then provides the information back to the client device through the caching server, and the API gateway.

FIG. 28 presents one embodiment of a flow map 2800 for the creation of a transaction invite. A user first accesses a transaction platform user interface 2810. In preferred embodiments the transaction platform interface is based on the React library. The user then creates the transaction invites 2820 for the video in the interface. The transaction invite data file is stored 2830 in a database. The database may serve as the sole source of authority to provide data from created transaction invites to other parts of the system. The transaction invite is converted into a JSON file 2840. The JSON file is stored 2850 in the database in the same folder that the video the transaction invite is linked to. The JSON file includes all information relating to a transaction invite linked to a video, including, and not limited to, the text of the invite, the product, product details, the timestamps, actions required for the transaction, the interfaces to be displayed during the transaction process, the UI and display information of the transaction invite and the transaction interfaces, their colors, font colors, size, speed of entry and exit, as well as the background color. This folder may also contain the video file itself, any playlists the video is part of, as well as different versions of the video, each of which is a different quality level. After confirmation that the file is successfully written to and stored in the video folder, the original transaction invite data file stored in the database is deleted 2860.

FIG. 29 is a diagrammatic representation of an example machine in the form of a computer system 2900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2900 includes a processor or multiple processor(s) 2905 (e.g., a central processing unit (CPU), a graphics processing unit (GPU), or both), and a main memory 2910 and static memory 2915, which communicate with each other via a bus 2920. The computer system 2900 may further include a video display 2935 (e.g., a liquid crystal display (LCD)). The computer system 2900 may also include an alpha-numeric input device(s) 2930 (e.g., a keyboard), a cursor control device (e.g., a mouse), a voice recognition or biometric verification unit (not shown), a drive unit 2937 (also referred to as disk drive unit), a signal generation device 2940 (e.g., a speaker), and a network interface device 2945. The computer system 2900 may further include a data encryption module (not shown) to encrypt data.

The components provided in the computer system 2900 are those typically found in computer systems that may be suitable for use with embodiments of the present disclosure and are intended to represent a broad category of such computer components that are known in the art. Thus, the computer system 2900 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 2937 includes a computer or machine-readable medium 2950 on which is stored one or more sets of instructions and data structures (e.g., instructions 2955) embodying or utilizing any one or more of the methodologies or functions described herein. The instructions 2955 may also reside, completely or at least partially, within the main memory 2910 and/or within the processor(s) 2905 during execution thereof by the computer system 2900. The main memory 2910 and the processor(s) 2905 may also constitute machine-readable media.

The instructions 2955 may further be transmitted or received over a network 2970 via the network interface device 2945 utilizing any one of several well-known transfer protocols (e.g., Hyper Text Transfer Protocol (HTTP)). While the machine-readable medium 2950 is shown in an example embodiment to be a single medium, the term "computer-readable medium" should be taken to include a single medium or multiple medium (e.g., a centralized or distributed database and/or associated caches and servers) that store the one or more sets of instructions.

The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 2970 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

FIG. 30 shows an exemplary deep neural network.

Neural networks, also known as artificial neural networks (ANNs) or simulated neural networks (SNNs), are a subset of machine learning and are at the heart of deep learning algorithms. Their name and structure are inspired by the human brain, mimicking the way that biological neurons signal to one another. Artificial neural networks (ANNs) are comprised of node layers, comprising an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

Neural networks rely on training data to learn and improve their accuracy over time. However, once these learning algorithms are fine-tuned for accuracy, they are powerful tools in computer science and artificial intelligence, allowing one to classify and cluster data at a high velocity. Tasks in speech recognition or image recognition can take minutes versus hours when compared to the manual identification by human experts.

In some exemplary embodiments, one should view each individual node as its own linear regression model, composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming the input of the next node. This process of passing data from one layer to the next layer defines this neural network as a feedforward network. Larger weights signify that particular variables are of greater importance to the decision or outcome.

According to some exemplary embodiments, deep neural networks are feedforward, meaning they flow in one direction only, from input to output. However, one can also train a model through backpropagation; that is, move in the opposite direction from output to input. Backpropagation allows one to calculate and attribute the error associated with each neuron, allowing one to adjust and fit the parameters of the model(s) appropriately.

In machine learning, backpropagation is an algorithm for training feedforward neural networks. Generalizations of backpropagation exist for other artificial neural networks (ANNs), and for functions generally. These classes of algorithms are all referred to generically as "backpropagation". In fitting a neural network, backpropagation computes the gradient of the loss function with respect to the weights of the network for a single input-output example, and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, are used. The backpropagation algorithm works by computing the gradient of the loss function with respect to each weight by the chain rule, computing the gradient one layer at a time, iterating backward from the last layer to avoid redundant calculations of intermediate terms in the chain rule; this is an example of dynamic programming. The term backpropagation strictly refers only to the algorithm for computing the gradient, not how the gradient is used; however, the term is often used loosely to refer to the entire learning algorithm, including how the gradient is used, such as by stochastic gradient descent. Backpropagation generalizes the gradient computation in the delta rule, which is the single-layer version of backpropagation, and is in turn generalized by automatic differentiation, where backpropagation is a special case of reverse accumulation (or "reverse mode").

With respect to FIG. 30, according to some exemplary embodiments, the system produces an output, which in turn produces an outcome, which in turn produces an input. In some embodiments, the output may become the input.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for enabling a media-linked transaction concurrently with playback of media, the method comprising:
    establishing a link from a media platform to a multi-layered model comprising a transaction layer, a video layer, and a device layer running in parallel on separate processor platforms;
    platforming the media in the video layer, the platforming comprising preparing the media platform for upload, conversion, storage, and playing of media content over a network connection;
    receiving a request from a viewer to play a particular media file, the request being initiated on a user device in the device layer;
    initiating the playback of the particular media file in response to the request;
    displaying one or more transaction invites within the particular media file to the viewer during the playback, the one or more transaction invites comprising:
        a visual element embedded within the playback including text, background color, text color, and positioning; and
        at least one active link associated with a transaction object supported by a transaction platform in the transaction layer, the at least one active link enabling the viewer to initiate the media-linked transaction within the visual element concurrently with the playback and without interrupting the playback;
    receiving user data from the one or more transaction invites by the transaction layer and video data from the video layer, the user data being used in conjunction with the video data to determine significance of a video attribute; and
    displaying the one or more transaction invites within the particular media file to the viewer during the playback, the one or more transaction invites comprising:
    the viewer accepting one invite of the one or more transaction invites;
    creating transaction data including a timestamp of the viewer acceptance of the transaction invite, and timestamps for every transaction step, including inputting user information, selecting different product options or add-ons, confirming the transaction, and completing the transaction;
    recording customization of the transaction invite, including the text of the transaction invite, the background color and the text color, the positioning, a transaction invite timestamp within a video, a timestamp in the video where the transaction invite disappears, a speed which the transaction invite enters or exits a screen, and horizontal and vertical positions of the transaction invite for a displayed linked product; and
    determining the transaction object by a large language model trained on viewership data and prior transaction data, the text of the transaction invite, background color and text color, positioning within the media, and when the transaction invite disappears.

2. The method of claim 1, the transaction platform further comprising at least one of: an online store managed by a creator of the media and an online store managed by a third party to the creator and the viewer.

3. The method of claim 1, the transaction platform supporting a customizable user interface by which a media creator is enabled to customize at least one aspect of the visual element.

4. The method of claim 1, the media platform comprising a distributed server network.

5. The method of claim 1, the transaction platform comprising a distributed server network.

6. The method of claim 1, the media comprising one or more of the following: a pre-recorded video, a livestream video, a pre-recorded audio, a livestream audio, a slideshow, and an interactive digital visual display.

7. The method of claim 1, further comprising implementing a timestamp function, the timestamp function comprising placing a timestamp at a point or segment in the media in which the transaction invite is to be displayed.

8. The method of claim 1, the transaction platform further configured to collect user information from the viewer by way of the media-linked transaction.

9. The method of claim 8, the transaction platform further configured to determine optimal selection of transaction objects for the one or more transaction invites in subsequent media content consumed by the viewer.

10. A system for conducting a media-linked transaction concurrently with playback of media, the system comprising:
    a multi-layered model comprising a transaction layer, a video layer, and a device layer each running in parallel on separate processor platforms;
    a transaction platform supported on the transaction layer, the transaction platform communicatively coupled with a media platform over a network connection, the media platform supported by the video layer and configured for upload, conversion, storage, and playing of media content over the network connection, the transaction platform further coupled with at least one user device over the network connection; and
    the transaction platform further comprising at least one computing device having a memory and a processor, the memory storing instructions which, when executed by the processor, perform the steps of a method comprising:
        receiving an indication that the media platform has initiated the playback of a particular media file in response to a user request;
        displaying one or more transaction invites within the particular media file to a viewer during the playback, the one or more transaction invites comprising:
            a visual element embedded within the playback including text, background color, text color, and positioning; and at least one active link associated with a transaction object supported by the transaction platform, the at least one active link enabling the viewer to initiate the media-linked transaction within the visual element concurrently with the playback and without interrupting the playback;

creating a timestamp of the user request of the transaction invite, and timestamps for every transaction step, including inputting user information, selecting different product options or add-ons, confirming the transaction, and completing the transaction;

recording transaction invite customization, including the text of the transaction invite, the background color and the text color, the positioning, a transaction invite timestamp within video, a timestamp in the video where the transaction invite disappears, a speed which the transaction invite enters or exits a screen, horizontal and vertical positions of the transaction invite for a displayed linked product;

determining, by a large language model, the text of the transaction invite, the background color and the text color, and the positioning utilizing the recording of the customization of the transaction invite;

receiving user data from the one or more transaction invites by the transaction layer and video data from the video layer, the user data being used in conjunction with the video data to determine significance of a video attribute; and determining the transaction object by the large language model trained on viewership data and prior transaction data, the text of the transaction invite, the background color and the text color, the positioning within the media, and when the transaction invite disappears.

11. The system of claim 10, the transaction platform further comprising at least one of: an online store managed by a creator of the media and an online store managed by a third party to the creator and the viewer.

12. The system of claim 10, the transaction platform supporting a customizable user interface by which a media creator is enabled to customize at least one aspect of the visual element.

13. The system of claim 10, the media platform comprising a distributed server network.

14. The system of claim 10, the transaction platform comprising a distributed server network.

15. The system of claim 10, the media comprising one or more of the following: a pre-recorded video, a livestream video, a pre-recorded audio, a livestream audio, a slideshow, and an interactive digital visual display.

16. The system of claim 10, further comprising implementing a timestamp function, the timestamp function comprising placing a timestamp at a point or segment in the media in which the transaction invite is to be displayed.

17. The system of claim 10, the transaction platform further configured to collect user information from the viewer by way of the media-linked transaction.

18. The system of claim 17, the transaction platform further configured to determine optimal selection of transaction objects for the one or more transaction invites in subsequent media content consumed by the viewer.

19. A method for executing a media-linked transaction concurrently with playback of media, the method comprising:

connecting to a multi-layered model comprising a transaction layer, a video layer, and a device layer running in parallel on separate processor platforms;

initiating playback of the media on a user device, the media supported by a media platform in the video layer and communicatively coupled to the user device by way of a network connection;

receiving one or more transaction invites within a particular media file during the playback, the one or more transaction invites initiated by a transaction platform supported by the transaction layer and communicatively coupled to the media platform and the user device by way of the network connection, the one or more transaction invites comprising:

a visual element embedded within the playback including text, background color, text color, and positioning; and at least one active link associated with a transaction object supported by a transaction platform, the at least one active link enabling a viewer to initiate the media-linked transaction within the visual element concurrently with the playback and without interrupting the playback;

executing the media-linked transaction within the visual element;

receiving user data from the one or more transaction invites by the transaction layer and video data from the video layer, the user data being used in conjunction with the video data to determine significance of a video attribute;

determining by a large language model the transaction object;

recording one or more transaction invite customizations, including the text of the one or more transaction invites, the background colors and the text colors, the positioning, transaction invite timestamps within a video, a timestamp in the video where the one or more transaction invites disappears, a speed which the one or more transaction invites enters or exits a screen, horizontal and vertical positions of the one or more transaction invites for a displayed linked product; and determining the transaction object by a large language model trained on viewership data and prior transaction data, the text of the transaction invite, the background color and the text color, the positioning within the media, and when the transaction invite disappears.

20. The method of claim 19, the transaction platform comprising at least one of: an online store managed by a creator of the media and an online store managed by a third party to the creator and the viewer.

* * * * *